United States Patent
Kawasaki et al.

(10) Patent No.: US 10,469,268 B2
(45) Date of Patent: Nov. 5, 2019

(54) UNIFIED ENCRYPTION CONFIGURATION MANAGEMENT AND SETUP SYSTEM

(71) Applicant: Pacific Star Communications, Inc., Portland, OR (US)

(72) Inventors: Charles Nobuo Kawasaki, Portland, OR (US); Rodney James Snell, Churchville, MD (US); Bryan Kelly Armstrong, Lake Oswego, OR (US)

(73) Assignee: Pacific Star Communications, Inc., Portland, OR (US)

( * ) Notice: Subject to any disclaimer, the term of this patent is extended or adjusted under 35 U.S.C. 154(b) by 89 days.

(21) Appl. No.: 15/369,267

(22) Filed: Dec. 5, 2016

(65) Prior Publication Data
US 2017/0324566 A1 Nov. 9, 2017

Related U.S. Application Data

(60) Provisional application No. 62/333,119, filed on May 6, 2016.

(51) Int. Cl.
H04L 9/32 (2006.01)

(52) U.S. Cl.
CPC .................... *H04L 9/3268* (2013.01)

(58) Field of Classification Search
None
See application file for complete search history.

(56) References Cited

U.S. PATENT DOCUMENTS

| | | | |
|---|---|---|---|
| 7,159,114 B1 * | 1/2007 | Zajkowski | G06Q 20/3552 713/171 |
| 8,494,485 B1 * | 7/2013 | Broch | H04L 9/3263 455/410 |
| 8,527,770 B2 * | 9/2013 | Brown | H04L 9/3226 713/155 |
| 8,966,260 B1 * | 2/2015 | Walter | H04L 63/08 713/156 |
| 9,147,086 B1 * | 9/2015 | Potlapally | G06F 21/64 |
| 9,271,142 B1 * | 2/2016 | Broch | H04L 41/0813 |

(Continued)

*Primary Examiner* — Jason Chiang
(74) *Attorney, Agent, or Firm* — Perkins Coie LLP

(57) ABSTRACT

The present technology relates to the field of configuration and setup of encrypted computer network transmission systems. In particular, the present technology relates to setting up and configuring network encryption systems, including MACsec, Internet Protocol Security (IPsec), and TLS protocols, in heterogeneous networks over Wireless Area Networks (WAN), Wireless Local Area Network (WLAN) or cellular links. In some embodiments, the present technology includes a method for setting up, configuring, and monitoring of encryption equipment providing encrypted links over WAN connections (typically IPsec VPN gateways and clients or TLS applications). The method includes communicating with encryption and PKI equipment necessary to automate the generation of encryption keys, digital certificates, and digital certificate signing requests. The method further includes communicating with the encryption equipment on one or both sides of an encrypted link to create security associations, and link encryption parameters, necessary for the encryptors to negotiate and establish encrypted links.

16 Claims, 22 Drawing Sheets

(56) References Cited

U.S. PATENT DOCUMENTS

| | | | |
|---|---|---|---|
| 2003/0126431 A1* | 7/2003 | Beattie | G06F 21/6218 713/156 |
| 2007/0094493 A1* | 4/2007 | Ali | G06F 21/34 713/156 |
| 2007/0174621 A1* | 7/2007 | Ducharme | G06F 21/10 713/176 |
| 2009/0113543 A1* | 4/2009 | Adams | G06F 21/33 726/18 |
| 2009/0198618 A1* | 8/2009 | Chan | G06Q 20/02 705/66 |
| 2009/0222657 A1* | 9/2009 | Bender | H04L 9/3265 713/156 |
| 2010/0146588 A1* | 6/2010 | Bergerson | H04L 63/166 726/3 |
| 2011/0197061 A1* | 8/2011 | Chou | H04L 9/006 713/156 |
| 2013/0105572 A1* | 5/2013 | Smith | G06Q 20/027 235/379 |
| 2013/0145146 A1* | 6/2013 | Suganthi | H04L 63/0428 713/153 |
| 2014/0181504 A1* | 6/2014 | Almahallawy | H04L 63/062 713/156 |
| 2016/0029211 A1* | 1/2016 | Furuta | H04L 9/088 380/270 |

* cited by examiner

Add VPN Wizard

Create a new VPN

This wizard adds a new VPN to the device. Specify a descriptive name for the IPSec tunnel and whether an existing Trustpoint should be used or new one should be created.

Description

VPN Type
- ● Soft Client
- ○ Site to Site

Trustpoint
- ○ Use Existing
- ● Create New

Revocation Check   ● None   ○ CRL   ○ OCSP

Key Size   ● 384   ○ 256

| Help | Cancel |   | <Back | Next |

*FIG. 6*

Add VPN Wizard

VPN Settings Summary

The VPN will be created with the following settings.

| | |
|---|---|
| Description | Inner Tunnel |
| Key Size | 384 |
| Certificate Subject Name | C=US,CN=REMOTE-INNER-GW |
| VPN Type | Site to Site |
| Interface | Ethernet0/0 |
| Peer Subject Name | Issuer Contains: CN=INNER-CA |
| Access List | VPN-ACL |
| Role | 172.16.1.1 |

☐ Request Certificate Now

| Help | Cancel | <Back | Create VPN |

*FIG. 7*

Request Certificate Wizard

Request a Certificate

Enter the information to be included in the certificate request.

Trustpoint    IQC_1

☐ Include device serial number

☐ Sign this certificate automatically using the following settings

■■■■ ☐         | Help | Cancel |         | <Back | Next |

UNIFIED ENCRYPTION CONFIGURATION MANAGEMENT AND SETUP SYSTEM

CROSS-REFERENCE TO RELATED APPLICATION

The present application claims priority to U.S. Provisional Application No. 62/333,119, filed May 6, 2016, titled "UNIFIED ENCRYPTION CONFIGURATION MANAGEMENT AND SETUP SYSTEM," which is incorporated herein by reference.

TECHNICAL FIELD

The present disclosure relates to the field of configuration and setup of encrypted computer network transmission systems.

BACKGROUND

Conducting mission critical operations in field, emergency, temporary, remote or distributed situations requires communications systems that maintain Confidentiality, Integrity, and Availability (CIA). Organizations must maintain CIA when using network-based, wired, line-of-site radio, radio, cellular, microwave, laser or Satellite Communication (SATCOM)-based communications, especially when relying on third parties to provide network communications transport services, or when using wireless communications technologies where transmission can be easily intercepted. To maintain CIA, organizations can use various encryption technologies at various technology layers, including, but not limited to, the ISO (International Organization for Standardization) data link, network, or transport layers. Organizations use protocols that include Media Access Control Security (MACsec), Virtual Private Network (VPN), or Secure Sockets Layer/Transport Layer Security (SSL/TLS) to ensure that information transmission cannot be stolen, tampered with, or disrupted. However, the setup and configuration of systems used to implement encryption in transit are exceedingly complex, and easy to mis-configure, which leads to downtime or poor security configurations that leave information vulnerable. Exacerbating the problem is the increasing use of a Public Key Infrastructure (PKI), which is used to distribute and manage encryption keys required on both sides of an encrypted link. PKI systems add a layer of complexity that is well beyond the training and expertise of most networking professionals, which leads to additional downtime and security vulnerabilities.

Organizations that need to deploy transmission security over large distances, or in dangerous or remote locations, are disadvantaged by current technology due to a lack of trained staff able configure and manage link encryption technology. In addition to setup, and configuration changes that are required to adjust to changing circumstances, the management of digital certificates and encryption keys adds additional technical skills not typically available in dangerous or remote locations, which makes the implementation of link encryption in transit difficult and expensive.

Recent advancements in encryption technologies now available in Commercial-Off-The-Shelf (COTS) equipment have been deemed secure enough by the United States National Security Agency (NSA), when configured correctly, to be used by United States military, intelligence, and civilian organizations to implement link encryption for the transmission of classified information, up to and including Top Secret information. The NSA approves these types of systems under a new program called "Commercial Solutions for Classified" (CSfC). To be approved under this program, however, organizations must deploy two sets of encryption technology, each from a different vendor (or using different, unrelated platforms). While this new capability enables a variety of new, important use cases, it implements additional complexity that requires yet even more training and configuration.

To deploy these systems, organizations typically include various types of networking and security equipment, including routers (used to direct the flow of voice/data), optimization equipment (used to reduce the size of network traffic over long distance radio links), VPN gateways and clients (providing encryption), firewalls, intrusion detection/prevention systems, event log managers, servers, Certificate Authorities (CA), and time servers. For systems that include encrypted Wide Area Network (WAN) access, systems may include digital radios and satellite modems. For systems that include encrypted Wi-Fi or cellular access, equipment can include Wi-Fi or base station routers, wireless controllers, packet cores, and mobile device managers. Lastly, users that connect to such systems may use devices such as laptops, smartphones, and tablets that also participate in the encryption solution by hosting encryption endpoint (client) technology.

Almost always, the equipment listed above is manufactured by different companies, providing different services, each with unique user interfaces and operator training requirements. This results in expensive training costs to educate operators on the equipment, lengthy setup times that often result in communications delays, system or communications downtime, including when equipment is misconfigured, and system unavailability, such as when a lack of trained experts results in systems being left unused. Perhaps as misleading for these types of systems is when they are configured to "work", but do so in an insecure manner—leading to organizations placing trust in untrustworthy systems.

In order to set up and configure the equipment appropriately, operators must be trained to diagnose and troubleshoot multiple, different, network, and security devices. In some cases, due to security policies in organizations requiring separation of duties, a single trained person may not be able to troubleshoot a problem—for example where a VPN administrator does not have sufficient authority to use a CA to sign a certificate. In such a case, end-to-end troubleshooting is made difficult because of errors introduced in handing off tasks from one individual to another, particularly when multiple manual steps are required.

SUMMARY

The present technology provides computer application software, machine-readable medium, systems and methods for setting up and configuring PKI-enabled network encryption systems, including MACsec, Internet Protocol Security (IPsec), and TLS protocols, in heterogeneous networks over WAN, Wireless Local Area Network (WLAN) or cellular links, that overcome drawbacks in the prior art and provide other benefits. At least one embodiment provides a method of setting up or configuring encryption links in a communication network having a plurality of operatively-interconnected network devices. The method includes setting up, configuring and monitoring of encryption equipment providing encrypted links over WAN connections (typically IPsec VPN gateways and clients or TLS applications). The method includes communicating with encryption and PKI equipment necessary to automate the generation of encryption keys, digital certificates, and digital certificate signing requests—necessary for encryption equipment to perform Internet Key Exchange (IKE). The method further includes communicating with the encryption equipment on one or both sides of an encrypted link to create security associations, and link encryption parameters, necessary for the encryptors to negotiate and establish encrypted links. The method also includes validation of the configuration to an organization's configuration standards, monitoring of certificate expiration dates, and monitoring of the status of the encryption equipment—ensuring that the system continues to operate in a secure manner over time.

Another embodiment of the technology provides a machine-readable medium storing instructions that, if executed by a computing system having a processor, cause the computing system to perform the described tasks above to encrypt links over WAN, WLAN or cellular network connections, where one side of the encrypted link may be an encryption gateway (such as an IPsec VPN gateway) and where the other side of the link is a mobile device such as a laptop, smartphone, or tablet, equipped with matching software encryption technology—or where the mobile device is equipped with a supplemental encryption device.

Another embodiment of the technology provides a machine-readable medium storing instructions that, if executed by a computing system having a processor, cause the computing system to perform the described tasks above to encrypt links over WAN, WLAN or cellular connections, where one side of the encrypted link may be an application server (such as a web server, email server, voice-over-IP proxy, or database server) using SSL/TLS (and Secure Real-time Transport Protocol (SRTP) for real-time traffic) at the session layer for encryption, and where on the other side of the link is a client-side application using SSL/TLS or SRTP, which may be hosted on a mobile device.

In all of the embodiments above, each type of link may be encrypted more than once, in a tunneled fashion, so that the encrypted link is protected by two or more layers of encryption. In this fashion, if one layer of encryption is breached, a second layer provides additional protection. In such a configuration, two instances of the technology may manage each layer of encryption independently, using similar methods and user interfaces, automating each layer independently, but providing reduced training requirements. The technology may also manage both layers of encryption of a single instance of the technology, when supplemented with cross-domain technologies or when configured in an organizationally-approved configuration.

In some embodiments, the present technology includes a method to establish encrypted communications where the method comprises: maintaining a dataset of default encryption values for implementing a selected one of a plurality of encryption policies associated with one or more organizations; querying, via a graphical user interface (GUI), a user to input values for configuring an encryption device; sending the input values over either in-band or out-of-band communications methods, and at least a portion of the default encryption values to the encryption device for configuring the encryption device based on the selected one of the plurality of encryption policies; based on the input values and the at least a portion of the default encryption values, sending first instructions to the encryption device to a generate a private key and a certificate signing request or performing the generation of the private key and the certificate signing request on behalf of the encryption device; transmitting the certificate signing request to a certificate authority for signature; sending second instructions to the certificate authority to sign the certificate signing request; and transmitting the signed certificate to the encryption device, wherein the transmitting the signed certificate to the encryption device causes the encryption device to load the signed certificate for use in establishing and maintaining encrypted communication in accordance with the selected one of the plurality of encryption policies.

The method can include querying, via the GUI, the user to input second input values for configuring a second encryption device; sending the second input values and a second portion of the default encryption values settings to the second encryption device for configuring the second encryption device based on a selected second one of the plurality of encryption policies; sending third instructions to the second encryption device to generate a second private key and a second certificate signing request or performing the generation of the second private key and the second certificate signing request on behalf of the second encryption device; transmitting the second certificate signing request to the first certificate authority or second certificate authority for signature; sending fourth instructions to the first or second certificate authority to sign the second certificate signing request; and transmitting the second signed certificate to the second encryption device, wherein the transmitting the second signed certificate to the second encryption device causes the second encryption device to load the second signed certificate for use in establishing and maintaining encrypted tunnels for communication. The encrypted tunnels are partially based on the first encryption device implementing encryption at a first layer of a communication stack and the second encryption device implementing encryption on a second layer of the communication stack.

The method can include implementing a separation of duties method, which includes causing a management system, in response to the first user, to cause the certificate signing request to be generated on the encryption device, and wherein the management system queues the certificate signing request for a second user for approval; sending, via the management system, the certification signing request to the certificate authority to causes the certificate signing request to be signed; and retrieving, via the management system, the signed certificate and loading it on the encryption device, or queuing it for the first user, wherein the first user causes the management system to load the signed certificate onto the encryption device.

In some implementations, the present technology includes a method for incorporating two methods of encryption concurrently or together. The method includes a first encryption device, first input values, a first private key, a first certificate signing request, and querying, via the GUI, a user to input second input values for configuring a second encryption device. The method further includes sending second input values and a second portion of default encryption values settings to a second encryption device for configuring the second encryption device based on a selected second one of the plurality of encryption policies; sending instructions to the second encryption device to generate a second private key and a second certificate signing request or performing the generation of the second private key and the second certificate signing request on behalf of the second encryption device; transmitting the second certificate signing request to the certificate authority or another certificate authority for signature; sending instructions to the certificate authority or another certificate authority to sign the second certificate signing request; and transmitting the second signed certificate to the second encryption device, wherein the transmitting the second signed certificate to the second encryption device causes the second encryption device to load the second signed certificate for use in establishing and maintaining encrypted tunnels for communication, wherein the encrypted tunnels are partially based on the first encryption device implementing encryption at a first layer of a communication stack and the second encryption device implementing encryption on a second layer of the communication stack.

Another aspect of the present technology provides a computer security system having a management system configured to maintain a dataset of default encryption values for implementing a selected one of a plurality of encryption policies associated with one or more organizations, and to validate and load multiple encryption methods for multiple devices on behalf of the multiple devices based upon the default encryption values and one or more of the plurality of encryption policies. A provisioning system is configured to implement the configuration of the multiple encryption methods associated with the plurality of encryption policies and on behalf of the multiple devices. A graphical user interface (GUI) system is configured to provide an encryption status of the multiple devices and configured to receive a request to stop an encryption session for at least one of the multiple devices.

BRIEF DESCRIPTION OF DRAWINGS

Embodiments of the present technology are described by way of exemplary embodiments, but not limitations, illustrated in the accompanying drawings in which like references denote similar elements, and in which:

FIG. 6 illustrates an exemplary setup/configuration Wizard screen requesting input from users, to be used in setting up configuration on encryption devices.

FIG. 7 illustrates an exemplary setup/configuration Wizard screen confirming settings to be applied to an encryption device.

FIG. 8 illustrates an exemplary setup/configuration Wizard screen requesting settings information from users, to be used in the generation of keys, certificates, and CSRs.

FIG. 11 illustrates an exemplary status screen showing status of a live VPN tunnel, as reported by a remote, inner VPN gateway-encryption device.

DETAILED DESCRIPTION

Figure 1:
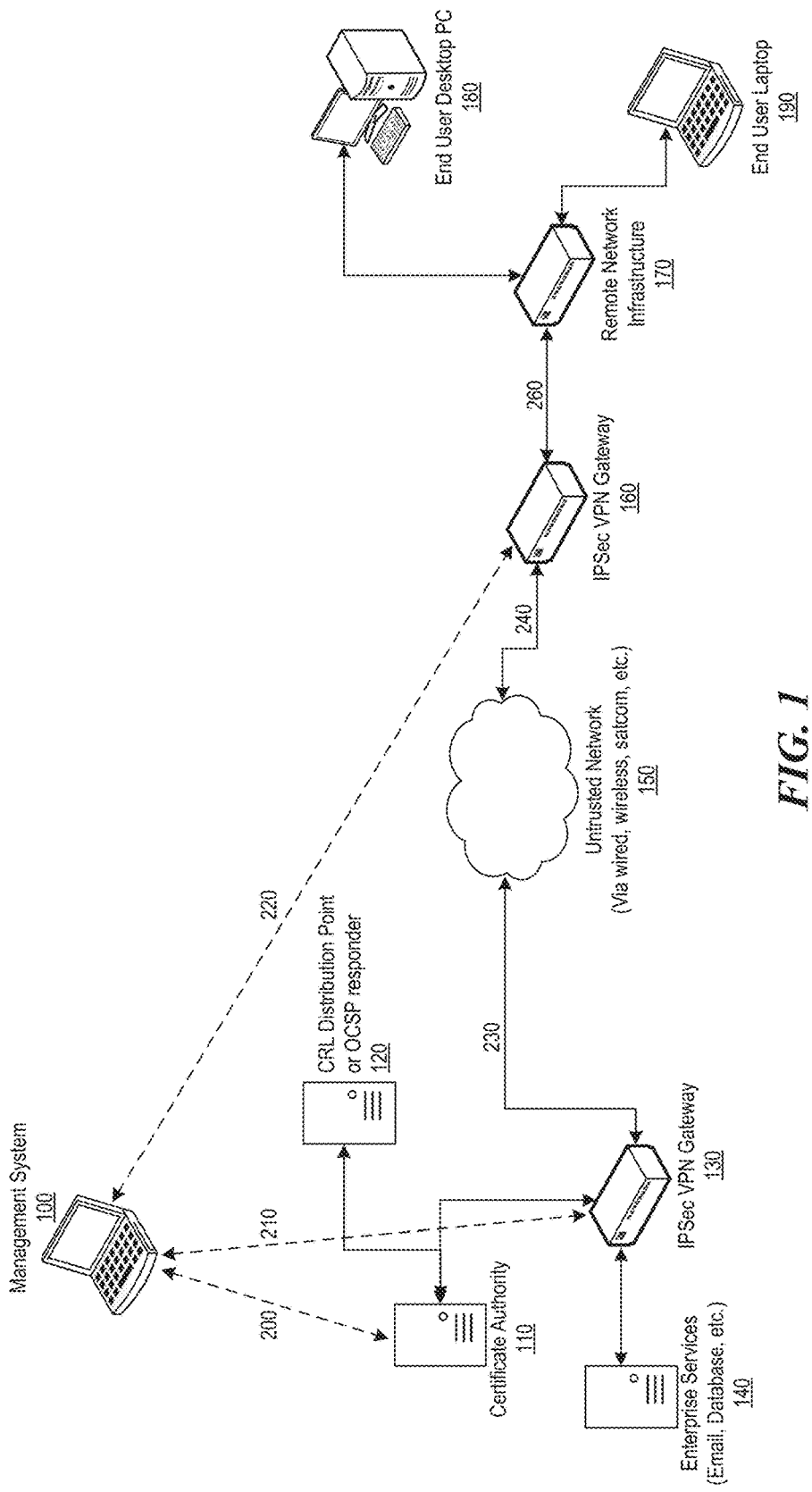
FIG. 1 illustrates a typical communications network transmitting information over an untrusted WAN link with encryption gateways on either side. One side provides a PKI infrastructure including a CA and a CRL (Certificate Revocation List) Distribution Point (CDP) or Online Certificate Status Protocol (OCSP) responder, along with enterprise services (such as email, voice PBX (Private Branch Exchange), VTC (Video Teleconferencing) MCU (Multipoint Control Unit), file storage, database, etc.). The other side represents a remote network extension providing access to one or more computers. The network is set up, monitored, and configured by the present technology.

The present disclosure describes systems, methods, processes and computer software in accordance with certain embodiments of the present invention. Several specific details of the invention are set forth in the following description and the Figures to provide a thorough understanding of certain embodiments of the invention. One skilled in the art, however, will understand that the present invention may have additional embodiments, and that other embodiments of the invention may be practiced without several of the specific features described below.

The technology, in accordance with at least one embodiment, provides the computer application software, related computer hardware and/or methods (referred to as "system") related to creating an easy-to-use user interface, automating and simplifying complex setup, configuration and diagnostic tasks otherwise requiring extensive manual interaction (on the part of highly trained advanced computer/network administrators) with a variety of computer network and encryption hardware and software components, frequently from more than a single manufacturer, pertaining to encryption of information over untrusted network links.

The system can be configured to automate large portions of the process of setup and configuration of the network such that the networking devices perform correctly in environments where communication is mission critical, but where the availability of highly-trained technical administrators may be limited, and where the process can be initiated and supervised by non-experts.

The technology of an aspect of the present disclosure relates to the deployment of IT (Information Technology) services by organizations involved in performing work, services, or collaboration in rugged locations, in locations on a temporary basis, or in locations where transmission infrastructure is limited, unreliable, or over-subscribed. These types of organizations can include military groups, emergency relief agencies or medical teams, diplomatic and aid organizations, news organizations, dignitaries, and delegations of traveling officials. It also includes law enforcement and emergency management agencies responding to disaster areas. It further includes organizations involved in ensuring reliable operations of critical infrastructure such as (but not limited to) health care organizations, energy production and transmission infrastructure, agriculture, banking, and transportation. It also relates to organizations involved in remote work projects such as oil exploration and extraction, mining, overseas construction, timber harvesting, and scientific exploration. It further relates to organizations with mobile users needing access to confidential information over wireless links in office or campus settings, mobile users needing access to confidential information from untrusted wireless locations (e.g., "Starbucks" or "United Airlines In Flight"), or in locations where wired infrastructure is unavailable such as on air-base flight lines.

Embodiments of the technology of the present disclosure can be configured for applications that address field operations to enable the quick establishment of full "office communications" capabilities in network-starved environments, or that address construction needs to enable quick setup of communications for field management, surveillance and other capabilities at construction locations prior to the establishment of permanent networking/computing capabilities. The technology can also be configured to address emergency backup systems configured to enable quick setup of temporary or backup networks where or when permanent IT equipment is damaged due to disaster. The technology may also be configured for fixed infrastructure where only lightly-trained administrators are available, or where advanced administrators desire streamlined and time-saving configuration and monitoring.

Aspects of this technology provide software systems equipped with automated means to troubleshoot and diagnose multiple network and encryption devices, to ensure that transmission of data can be made successfully, in a properly configured and encrypted form, while providing a single, integrated, user interface appropriate for novice operators.

Devices managed by the software may include servers, routers, firewalls, mobility controllers, and VPN gateways, VPN clients providing encryption or PKI services, at any layer of the communications stack, including MACsec, IPsec, SSL/TLS, etc. Devices may also include CAs, OCSP responders, CDPs, and time servers. The software may also manage provisioning of EUDs, such as smartphones, tablets, and laptops. The devices are typically developed/manufactured from a variety of vendors, since no one vendor creates all of the necessary technology to complete these systems, and in the case of CSfC systems, multiple-vendor diversity is required for security purposes.

In at least one embodiment, the management software may also manage supplemental devices integrated into the network, but not directly related to the encryption/PKI services—in order to provide a more complete view of the network under one user interface. Such devices may include devices such as (but not limited to) network switches, voice PBXs, radio infrastructure, radio controllers, WAN optimization devices, auditing and logging systems, and cyber security devices such as firewalls, authentications systems, and IDSs (Intrusion Detection Systems)/IPSs (Intrusion Prevention Systems), etc. Any or all of the devices under management may be hardware appliances or software packages deployed locally, as virtual solutions, or in the cloud.

The management software can be an integrated computer application that sets up, configures and monitors the functionality on a plurality of encryption and PKI devices from multiple manufacturers, specifically displaying the parameters required for novice operators to initiate, supervise and ensure the system is configured and operating correctly. Aspects of the software and/or system can further include the ability to collect and display information from multiple network and encryption devices, on command of the operator. The software can use heuristics to determine misconfigured settings, and alert operators (directly, or to integrated Security Information and Event Management (SIEM) or logging systems) to settings that are out of compliance with organizational policies.

Specific types of tasks that the management software performs include automating the process of creating, validating and loading VPN configuration information into encryption equipment (hardware or software), causing VPN equipment to generate public/private key pairs, causing VPN equipment to generate digital certificates such as in the X.509 format, and generating CSRs, or conducting such tasks on behalf of VPN equipment. The software additionally orchestrates the transmission and signing of the CSRs through online, in-band or out-of-band means (in either case, over trusted networks), and also orchestrates the manual transmission of CSRs and signed digital certificates (using removable digital media such as USB drives or CD-ROM R/W) where organizational policies prohibit online transmission. The process automates significant portions of these tasks, but also performs the tasks, initiated and supervised by administrators.

The management software further configures and monitors CAs, providing summary information about the status, use, and expiration of certificates. The software causes the CSRs to be processed, validated, and signed by CAs, so that they are ready for use by the VPN equipment. The management software may perform most or all of these functions "on behalf of" the equipment, since many vendors equipment does not support the capability or does not support it with sufficient security to meet organizational requirements. The CSR processing may be initiated by a single step integrated into the user interface during the setup of an encryption device, or may be supplemented with an additional step that requires a second system/security administrator to approve the CSR request at the CA, or through the management software interface at the CA. This additional step may be performed by a security administrator who is logged into the management software, with a different role than that of the person initiating the CSR request. By requiring this separate step, organizations can implement a strong "separation of duties"-based process. In this mode, the management software can simply require a "one button" confirmation from the CA security administrator, and then can proceed to sign the CSR and generate (and transmit) the signed digital certificates. Both the end-to-end CSR signing process described herein, and the process that requires simple security administrator confirmation "in the loop", represents a substantial improvement over the state of the art, where typical systems require extensive manual, slow, and highly-error-prone processes for each step. While single vendors have attempted to create completely automated means for provisioning their own point solutions (such as the distribution of policies between firewalls of a single "make"), these systems typically do not work across the entire process of provisioning as described above, nor do they include a "human-in-the-loop" process that ensures strong security oversight.

Additionally, the management software can cause CAs to generate CRLs, and to transmit them to CDPs via online in-band or out-of-band means, or manual means. The CAs may be configured to transmit CRLs without further intervention from the management software, or the management software may assist in that process, which may include human supervision.

The management software can configure VPN equipment from multiple vendors, to only accept VPN connections configured to meet stringent organizational requirements. In the case of CSfC programs, that can include disabling any ability to accept VPN connection requests with parameters that are out of compliance with CSfC regulations, and can configure the devices to report any such attempts.

The management software provides methods to revoke digital certificates. Administrators may select from the list of issued certificates (singly or in bulk), and may use the management software's user interface to revoke certificates, providing revocation dates and reasons for revocation. The management software may provide the means to automatically cause CRL updates and transmissions to be integrated into that process. The management software may also communicate with encryption devices to immediately terminate active encryption sessions associated with revoked certificates. This process provides considerable integration over the state of the art, which today requires manual intervention to terminate ongoing encrypted sessions—which would only otherwise be terminated at the expiration of session keys—exposing organizations to significant security vulnerabilities.

The system has a GUI that may be run as a Windows, Linux, web-based, PDA (Android, etc.), or embedded application providing monitoring and diagnostics that enable operators to use simple, GUI-based actions to view summary status and perform configuration tasks across multiple network devices. The system of at least one embodiment also includes a monitoring and alerting system and interfaces to the devices in the network via any available protocol or API (Application Programming Interface) to retrieve status and performance information on a regular basis, and on command. Protocols or APIs include Simple Network Management Protocol (SNMP), Windows Management Instrumentation (WMI), Hypertext Transfer Protocol (HTTP), Secure Shell (SSH), Transmission Control Protocol/Internet Protocol (TCP/IP), User Datagram Protocol (UDP), Serial, Remote Procedure Call (RPC), and application-specific protocols.

The system can also include a software application running on a laptop or server presenting a GUI with screens used to view status and configuration results, or a monitoring/device interface portion of the software application used to retrieve status, provide alerts, and communicate with the devices to change settings. The system includes devices configured for the generation of encryption keys, signing of digital certificates, and encrypting communications. The system can also include software applications with heuristics used to detect errors through the analysis and comparison of configuration settings against organizational policies.

The system can further have portions of the software running in a distributed manner, such that portions of the process are accomplished by software agents. These agents may be run on computing devices such as servers, workstations, etc., and may be co-resident with other services such as the CA, VPN gateways, and end devices. These agents may be operatively coupled to portions of the encryption equipment or PKI equipment as required to accomplish portions of the methods. The agents may communicate with the other portions of the management system using online means, or may receive instructions, data, or files through manual transfer means, when online means are not available or when policy prevents online connections between components of the system. The agents may have GUIs to enable supervision, and human-in-the-loop capabilities.

Although not required, aspects of the technology described herein can be embodied as special-purpose hardware (e.g., circuitry), as programmable circuitry appropriately programmed with software and/or firmware, or as a combination of special-purpose and programmable circuitry.

The technology may be implemented as computer-executable instructions, such as routines executed by a general or special purpose data processing device (e.g., a server or client computer). Aspects of the technology described herein may be stored or distributed on tangible machine-readable medium, including, but not limited to, floppy diskettes, optical disks, Compact Disc Read-Only Memories (CD-ROMs), magneto-optical disks, ROMs (Read-Only Memories), Random Access Memories (RAMs), Erasable Programmable Read-Only Memories (EPROMs), Electrically-Erasable Programmable Read-Only Memories (EEPROMs), magnetic or optical cards, flash memory, magnetically or optically readable computer discs, hard-wired or preprogrammed chips (e.g., EEPROM semiconductor chips), nanotechnology memory, biological memory, or other type of media/machine-readable medium suitable for storing electronic instructions. Alternatively, computer-implemented instructions, data structures, screen displays, and other data related to the technology may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, CD-ROMs, magneto-optical disks, ROMs, RAMs, EPROMs, EEPROMs, magnetic or optical cards, flash memory, or other type of media/machine-readable medium suitable for storing electronic instructions. Computers may employ Central Processing Unit (CPU) or processor to process information. Processors may include programmable general-purpose or special-purpose microprocessors, programmable controllers, Application-Specific Integrated Circuits (ASICs), Programmable Logic Devices (PLDs), embedded components, a combination of such devices, and the like. Processors execute program components in response to user and/or system-generated requests. One or more of these components may be implemented in software, hardware, or both hardware and software. Processors pass instructions (e.g., operational and data instructions) to enable various operations.

The phrases "in some embodiments," "according to some embodiments," "in the embodiments shown," "in other embodiments," and the like generally mean that the particular feature, structure, or characteristic following the phrase is included in at least one implementation of the present technology, and may be included in more than one implementation. In addition, such phrases do not necessarily refer to the same embodiments or different embodiments.

The computing devices on which the system is implemented may include a central processing unit, memory, input devices (e.g., keyboard and pointing devices), output devices (e.g., display devices), and storage devices (e.g., disk drives). The memory and storage devices are machine-readable medium that may be encoded with computer-executable instructions that implement the system, which means a machine-readable medium that contains the instructions. In addition, the instructions, data structures, and message structures may be stored or transmitted via a data transmission medium, such as a signal on a communications link, and may be encrypted. Various communications links may be used, such as the Internet, a LAN (Local Area Network), a WAN, a point-to-point dial-up connection, a cell phone network, and so on.

In accordance with some embodiments of the present technology, the memory can encompass any type of, but is not limited to, volatile memory, nonvolatile memory, and dynamic memory. For example, the memory can be random access memory, memory storage devices, optical memory devices, media magnetic media, floppy disks, magnetic tapes, hard drives, SDRAM, RDRAM, DDR RAM, EPROMs, EEPROMs, CDs, DVDs, and/or the like. In accordance with some embodiments, the memory may include one or more disk drives, flash drives, databases, tables, files, local cache memories, processor cache memories, relational databases, flat databases, and/or the like. In addition, those of ordinary skill in the art will appreciate many additional devices and techniques for storing information that can be used as memory.

Embodiments of the system may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on.

Embodiments of the system may be implemented inside various operating environments where virtual machine hypervisors are used to host multiple operating systems and multiple instances of the management system on a single hardware host. Using the security properties of hypervisors, it may be possible to use a single hardware host to practice multiple instances, each connected to networks of different security classifications.

Using cross-domain guards or "reference monitors", the system may be configured such that a single instance of the management system connects to and controls encryption and PKI components residing in networks of different classifications.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

From the foregoing, it will be appreciated that specific embodiments of the technology have been described herein for purposes of illustration, but that various modifications may be made without deviating from the spirit and scope of the described technology. For example, the described technology is applicable to any wireless device that implements an Over-The-Air (OTA) mechanism, including cellular phones, PDAs, and other wireless devices. Accordingly, the technology is not limited except as by the appended claims.

FIG. 1 illustrates the base example of an embodiment of the present technology. This configuration provides a single layer of IPsec VPN encryption of communications over an untrusted network 150 such as a cellular network perhaps operated by a commercial carrier, even overseas in hostile environments. Other untrusted networks would include long-distance Internet carriers, commercial SATCOM providers, or any network out of the control of the information owner. In such networks, an organization may control the equipment on either side of the network, and may rely on the encryption equipment to secure the information in transit.

At an organization's headquarters, datacenters, or "teleports", the organization can deploy IPsec VPN gateways 130 providing encryption for all data ingressing/egressing the organization, typically to/from any number of enterprise data services 140 such as email services, voice PBXs, video teleconferencing, access to shared file storage, access to enterprise applications such as accounting, etc.

The information is encrypted/decrypted on the "remote" side of the untrusted network with a remote IPsec VPN gateway 160, as would typically be deployed in a corporation's branch office, in a retail organization's retail outlet, in a hotel chain's hotel, or at a remote/forward military base or communications vehicle. Remote users requiring access to enterprise services 140 are able to access those services transparently, because encryption/decryption is taken care of by the IPsec gateways.

FIG. 1 illustrates a peer-to-peer architecture over the untrusted network. However, in reality, many implementations will have multiple remote sites, even hundreds or thousands. To simplify and secure encryption key management, organizations are looking to PKI, which provides substantial security benefits, such as the ability to renew and revoke keys "over the air", in this case, through the untrusted network, 150 eliminating the need to travel to remote sites to perform management tasks (a task that is typical in the Department of Defense (DoD) with current classified encryptors). The backbone of the PKI infrastructure in FIG. 1 is the CA 110 and Certificate Revocation List (CRL) Distribution Point (CDP) or OCSP responder 120. The CA's primary role is to sign digital certificates, a critical step required to enable mutual authentication of a device or user's public key. The CDP and OCSP responder have functionally-equivalent roles. They provide access to the list of revoked digital certificates. (A revoked certificate is one which is deemed insecure because it was lost, stolen or otherwise compromised.)

The Management System 100 described herein in accordance with at least one embodiment of the present technology is operatively coupled to (but typically separate from) one or more components within the PKI and encryption system, providing a GUI to operators for setup, configuration, monitoring, and troubleshooting purposes. The system 100 may be connected 200, 210, 220 in-band, using the primary communications methods to communicate with the components, or may connect out-of-band, using separate VLANs, separate networks or using serial connections. In any of the cases, it's assumed the system 100 uses trusted communications means to perform its management and configuration tasks, such that no management functions are conducted over the untrusted network without encryption. In one embodiment, system 100 performs the initial configuration on the IPsec VPN Gateway 160 (and other devices in the remote infrastructure 170 and End User Devices 180/190) prior to the devices being transported to its destination. In some configurations (illustrated in FIG. 3B through FIG. 3G), communications may consist of separate instances of the management software of the same or different makeup, where data is transferred manually via removable media, in accordance with organization policies that may require "air-gapped" data transfer, particularly where cross-domain transfer is required. Additionally, subsets of the system may be co-resident with components of the systems, where components do not have management communications capabilities that can be remotely integrated into the management system, or where administrators need to perform manual steps to conduct a procedure. For example, an agent of the system may reside on the CA 110, conducting communications between the Management System 100 and the CA 110. As illustrated in the following flow charts and screens, the Management System 100 communicates with one or both IPsec VPN gateways 130, 160, as well as the CA 110, and may indirectly cause the CA to publish a CRL to be loaded automatically, manually, or with an "air-gapped" procedure onto the CDP or OCSP responder 120.

Figure 2A:
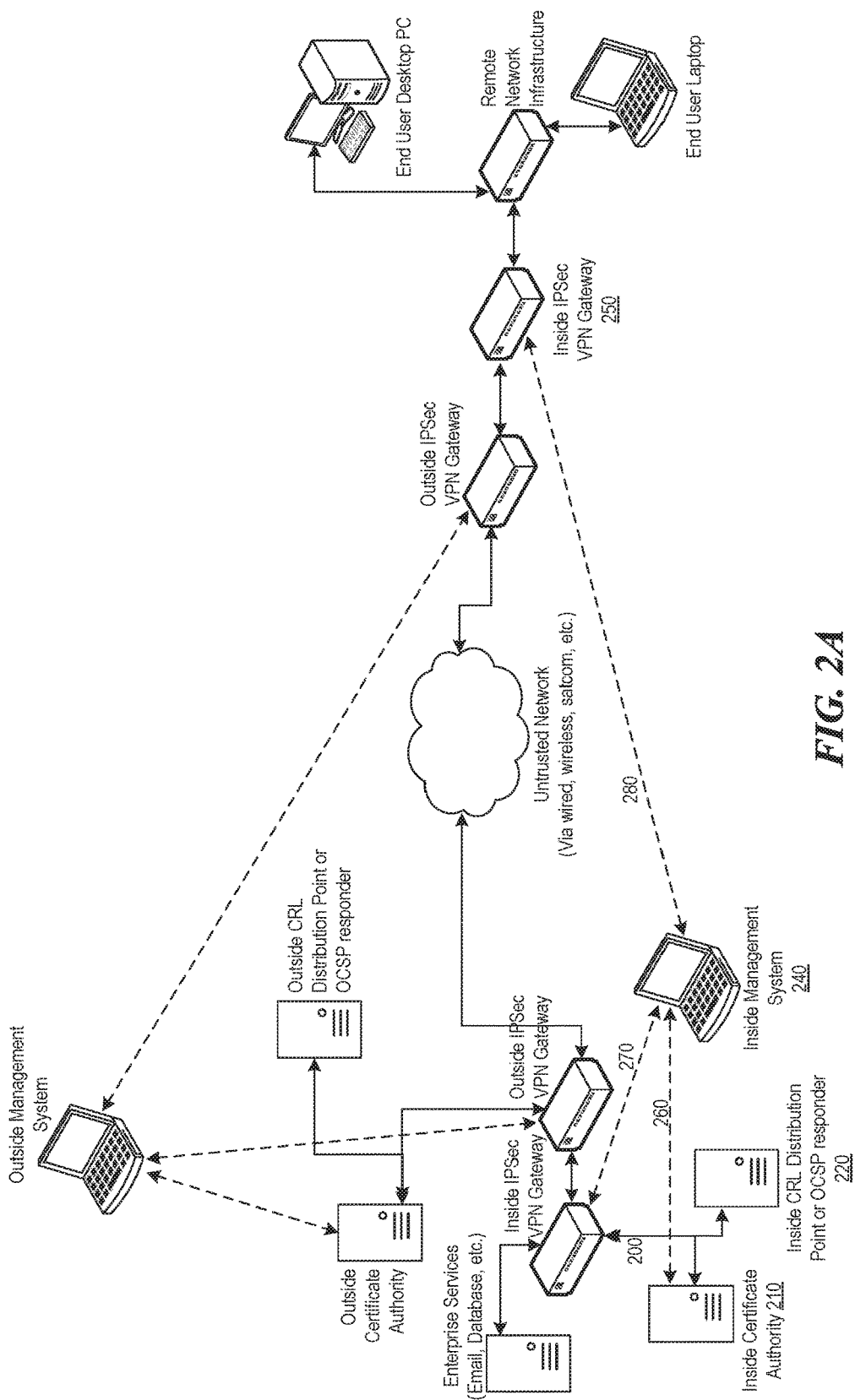
FIG. 2A illustrates a network similar to FIG. 1, with the addition of a second layer of encryption and PKI infrastructure (each device pre-pended with "Inside"). This second layer tunnels encrypted traffic inside the first encrypted tunnel from FIG. 1, implemented with components re-labelled with a pre-ended "Outside" label. The network is set up, monitored, and configured by the technology.

FIG. 2A illustrates a further embodiment of the system 100 in FIG. 1, operatively coupled to configure encryption equipment in a PKI infrastructure, and performing encryption of data in transit over an untrusted network. In this configuration a second set of IPsec VPN equipment 200, 250 is installed at both the HQ (Head Quarters)/NOC (Network Operations Center)/Teleport and remote sites. The equipment is placed "in-line", providing an additional level of encryption. Thus attackers present in the untrusted network would need to first break the original (outside) encryption implemented by the first set of VPN equipment, then break through the second layer (inside) layer of encryption, in order to access unencrypted information. This inside layer of encryption is complemented with a CA 210 and CDP/OCSP responder 220 providing services to the inside network.

The two layers of infrastructure are ideally provided by equipment from different manufacturers, such that if a vulnerability is found in one manufacturer's equipment, that vulnerability can be fixed before a similar one is found in the second manufacturer's equipment. This diversity of manufacturers provides substantially enhanced protection, but adds complexity. The Inside Management System 240 can provide a similar, if not identical, user interface for system administrators, even when the encryption and PKI equipment in each layer (inside and outside) has completely different user interfaces.

Another embodiment of the system (not shown) includes the ability for a single instance of the management system to be operatively coupled to both sets of encryption equipment in any of the dual-layer configurations described herein, where allowed and configured in accordance with organizational policies. In such instances the addition of a cross-domain guard or "reference monitor" may be required to assure that no information other than the management information crosses from the inner to the outer layer systems.

Figure 2B:
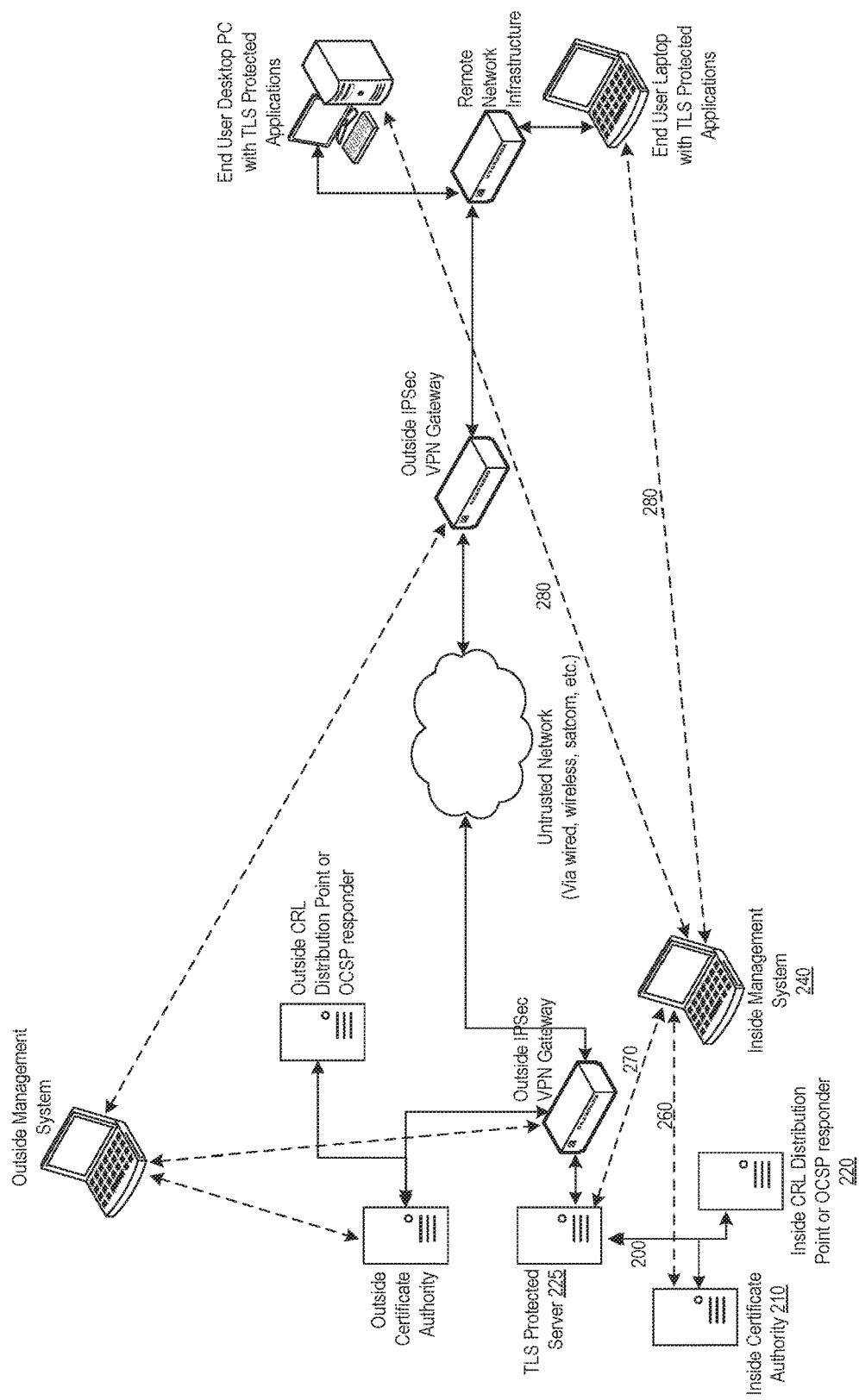
FIG. 2B illustrates an alternate embodiment of the CSfC WAN VPN configuration, where the inside IPsec VPN system is replaced by a transport layer encryption solution utilizing PKI. The IPsec VPN gateway is replaced by one or more servers running application software with TLS encryption, achieving two layers of tunneled encryption.

FIG. 2B illustrates a configuration similar to FIG. 2A, but, instead of IPsec VPN Gateways providing an inner layer of encryption, enterprise services are provided by transport layer security typically implemented by software residing on servers, known as TLS protected servers 225. Examples of services with integrated TLS encryption include email servers, web servers, voice/video session controllers/proxies such as voice PBX, VTC MCU, etc. On the remote side of the untrusted network, the second remote VPN gateway from FIG. 2A is removed, and instead client application software (web browsers, email clients, voice clients) is loaded on EUDs (laptops). These client applications are equipped with TLS encryption clients that match the HQ-side TLS-protected servers. One special type of TLS system is Virtual Desktop Infrastructure (VDI) or Virtual Mobile Infrastructure (VMI) solutions that use TLS for communications. In those environments, any desktop or mobile application can be secured with matching thin-client application containers on remote EUDs. FIG. 2B Item 280 shows the inside Management System operatively coupled to the EUD TLS client application. This may be performed in-band, out-of-band, or air-gapped and manual, particularly for the transfer and provisioning of digital certificates. Additionally, agents or subsets of the management system may be deployed on EUDs to assist with secure communications needs. As with System 100 in FIG. 1, its assumed that the inside Management system communicates with the devices under management through a trusted network, and that configuration tasks may be performed prior to the devices being transported to the final destination.

Figure 3A:
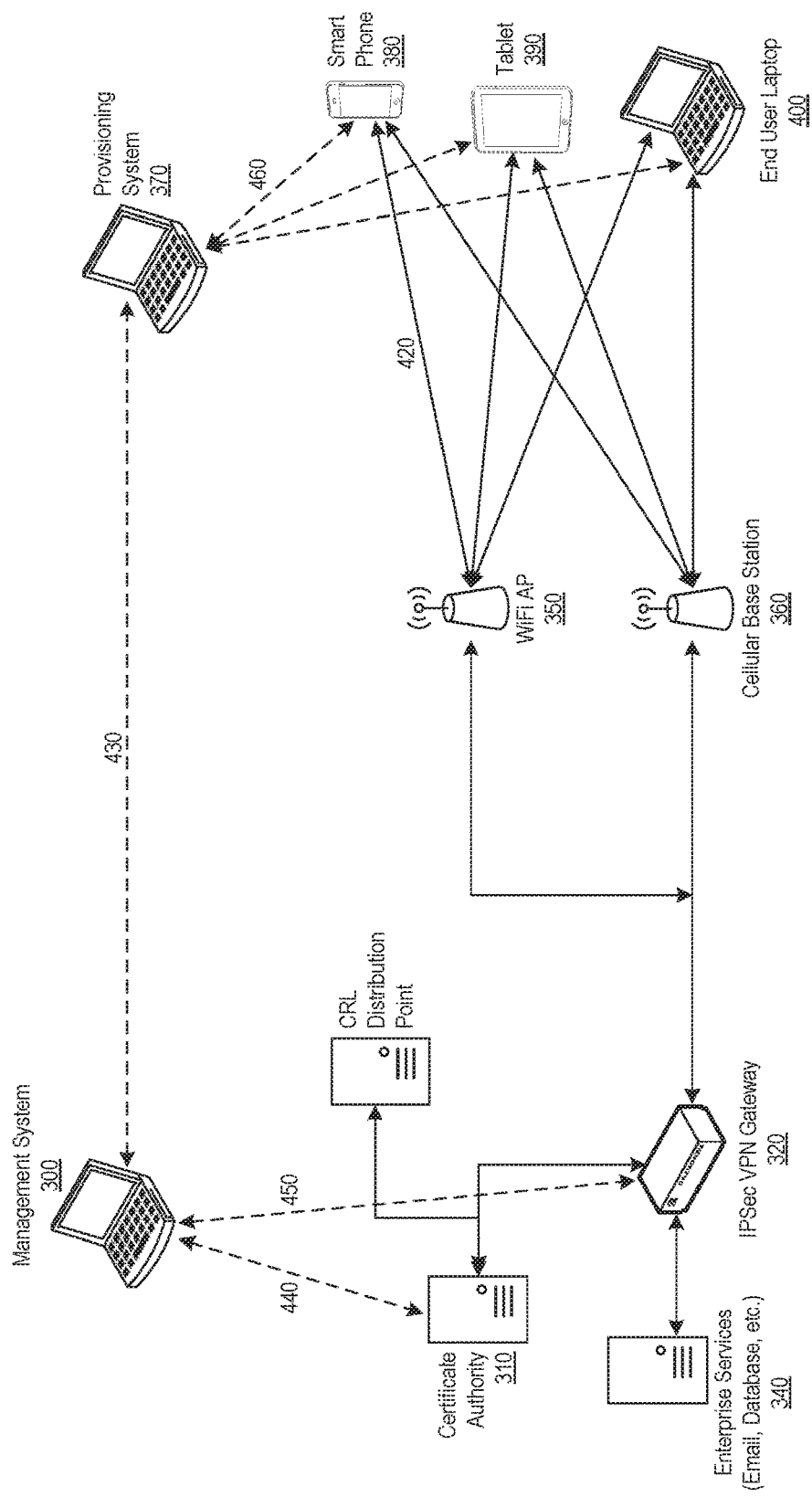
FIG. 3A illustrates a typical communications network transmitting information over an untrusted local wireless link using an encryption gateway and a PKI infrastructure including CA and CRL Distribution Point (CDP), along with enterprise services. The communications are transmitted over wireless links, and are provided to any type of mobile device. The mobile devices encrypt/decrypt the communications using client VPN software loaded on the devices, or using supplemental hardware devices.

FIG. 3A illustrates a system using an IPsec VPN component securing transmission over wireless infrastructure to mobile devices. This illustration shows an HQ/NOC/Teleport architecture similar to FIG. 1. However, the untrusted network is specifically wireless in nature, and the EUDs 380, 390, 400 are mobile devices that wirelessly connect to an untrusted network such as a Wi-Fi 350 or cellular 360 network, as opposed to using a remote IPsec VPN gateway for encryption/decryption services as shown in FIG. 1. In this architecture, users may use EUDs that are unmodified COTS equipment that operate just like any commercial/consumer EUD, so long as a correctly configured, software-based encryption solution is loaded/integrated on the device. Because the VPN equipment and VPN clients running on EUDs are independent of the radio infrastructure such as Wi-Fi 350 or cellular 360, the data is encrypted over any channel, and devices may roam across radio infrastructures without any reconfiguration required. The Management System 300 manages the CA 310, CDP/OCSP responder and IPsec VPN gateway 320 at the HQ/NOC/Teleport. The Management System may have a separate instance of the software, a subset of the software, or an agent running on a separate host, acting as a Provisioning System 370.

The Provisioning System is temporarily operatively coupled to EUDs 380, 390, 400 to perform initial configuration and setup of VPN client software (which may be built into the EUD's operating system, may be run as a service, or may be a separate software application) residing on EUDs. The Provisioning System may use USB connectivity, Ethernet, or wireless transmission 460 to perform this provisioning step. The Provisioning System 370 may further consist of an agent or software subsystem loaded on the EUDs to assist in this process if the Operating System (OS) or VPN client does not support all functionality required to accomplish the provisioning. For example, this may be the case where a mobile device's VPN client software is unable to generate a public/private key pair, or where that functionality does not include the ability to transmit CSRs using online means. In this case, the Provisioning System may cause the device to generate key pairs and communicate the CSRs, and may provide the communications infrastructure necessary to transmit the CSRs to the Management System 300 through the trusted transmission link 430, which, in turn causes the CA 310 to sign and return valid digital certificates, which, in turn, are installed on the EUDs by the Provisioning System. In the case where the EUD does not have the ability to generate keys at all, the Provisioning System may generate keys on behalf of the EUD, then follow similar procedures as outlined above to cause those keys to be validated and loaded on the EUDs. The Provisioning System may perform all of its functions in an automated manner, but in one embodiment requires operator initiation of the process, with operator supervision and confirmation, to ensure security procedures (per organizational requirements) are met.

Figure 3B:
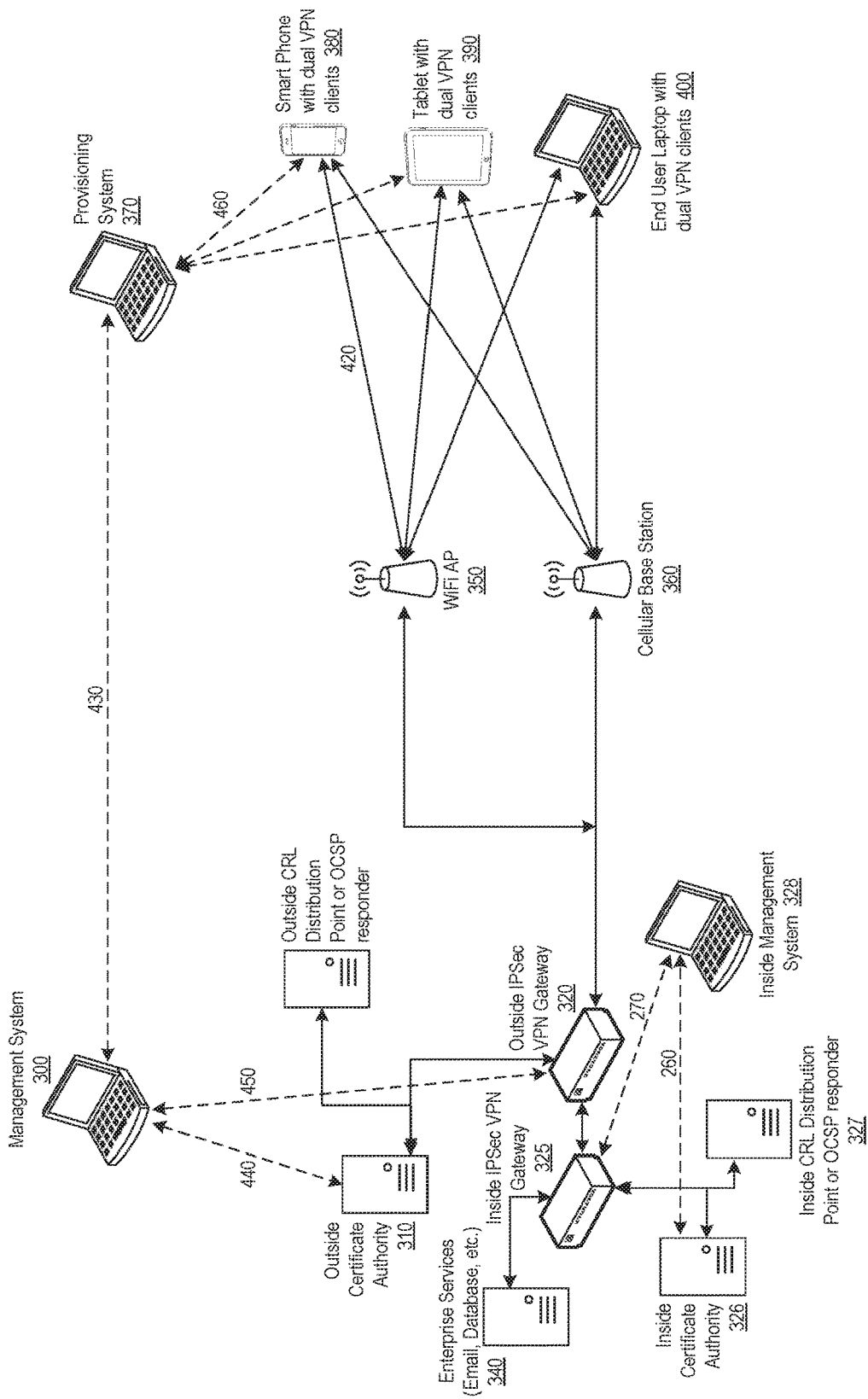
FIG. 3B illustrates an alternative embodiment of FIG. 3A. In this illustration, a second layer of IPsec VPN is implemented, with an IPsec VPN gateway on the infrastructure side of the untrusted network, with dual VPN clients loaded on the mobile End Users' Devices (EUDs).

FIG. 3B illustrates a configuration of the system similar to FIG. 3A, but includes the addition of a second set of encryption and PKI equipment 325, 326, 327, (labelled "inside") at the HQ/NOC/Teleport. In this embodiment, two tunneled IPsec VPN gateways provide dual encryption, further protecting the data in transmission. The "inside" equipment is set up, configured, and monitored by a second instance of the system 328. In this configuration, the EUDs host two VPN clients, providing matching encryption/decryption to the dual IPsec VPN gateways. A single Provisioning System 370 may be used to provide both of the EUD VPN clients, or the system may be configured to use two independent provisioning systems, depending on organizational policies.

Figure 3C:
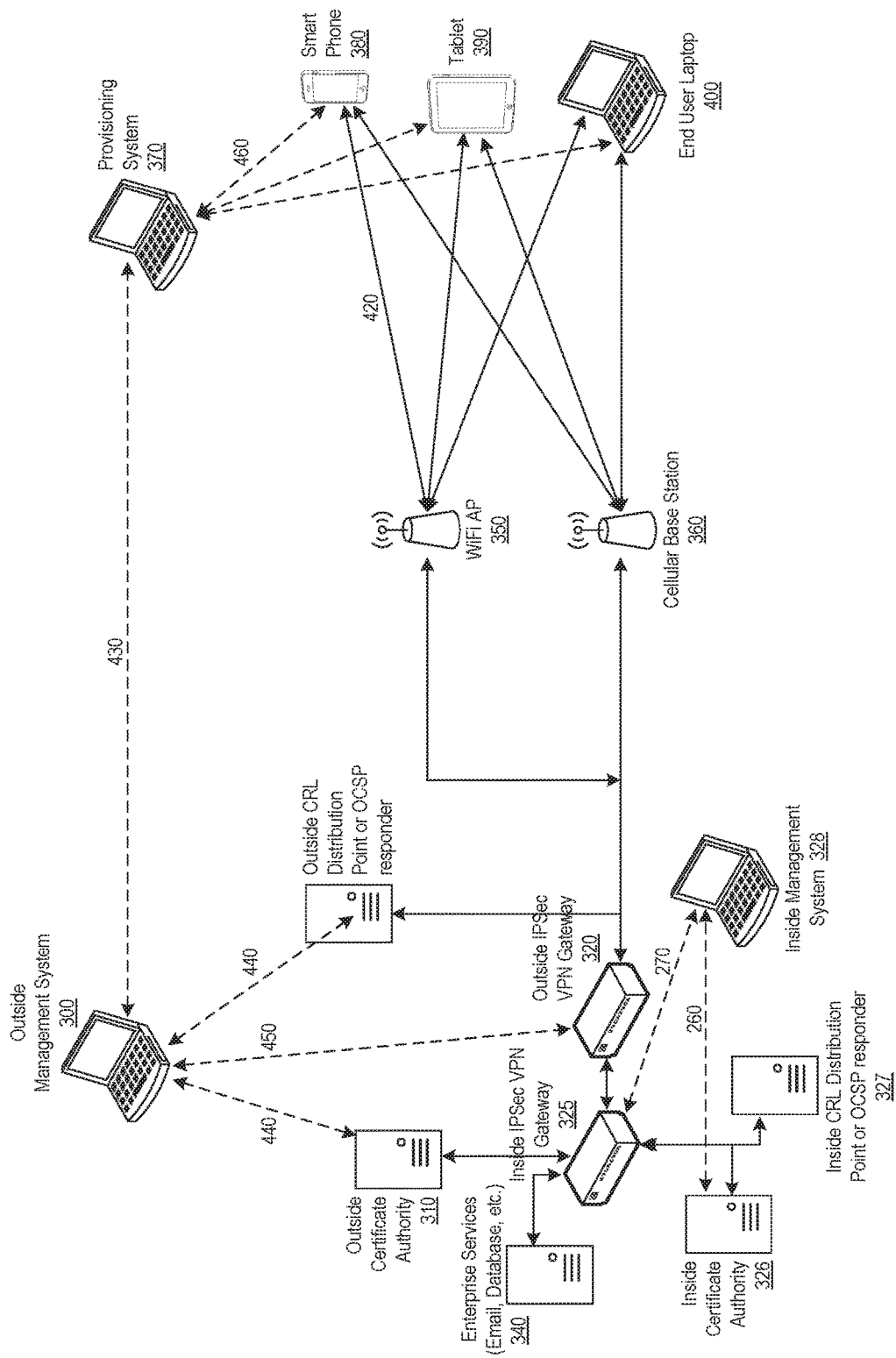
FIG. 3C illustrates a configuration similar to FIG. 3A. In this embodiment, the Outside CA resides on the "inside network". Access to the Outside CA is performed through routing or network configuration, out-of-band for management or CRL distribution, or through systems approved for cross-domain access.

FIG. 3C illustrates an embodiment similar to FIG. 3B, where the Outside CA 310 resides and is connected to the inside network equipment for the added security of two IPsec VPN Gateways. In any of the embodiments of the system containing two layers of encryption, the Outside CA may be protected in this manner. Additionally, in this figure the Outside CDP/OCSP responder may be placed outside of the Outside IPsec VPN gateway 320, providing access to the services provided by the CDP/OCSP responder for devices that are not inside the outer VPN tunnel, and/or that need access to those services prior to establishing VPN connections. Similarly (but not shown), the Inside CDP/OCSP responder 327 may be placed outside of the inner network for similar reasons.

In this embodiment, the Management System 300 or 328 may be responsible to cause the inner or outer CA 310 to publish a CRL and transmit it to the CDP, using in-band, out-of-band, or manual "air-gapped" means, in order to cross domain boundaries between an inner network CA 310 and its externally-placed CDP/OCSP responder. The Management System may be configured to directly transmit the CRL, may cause the CA to transmit the CRL, or may save the CRL to removable media, to be imported into the CDP/OCSP responder.

Figure 3D:
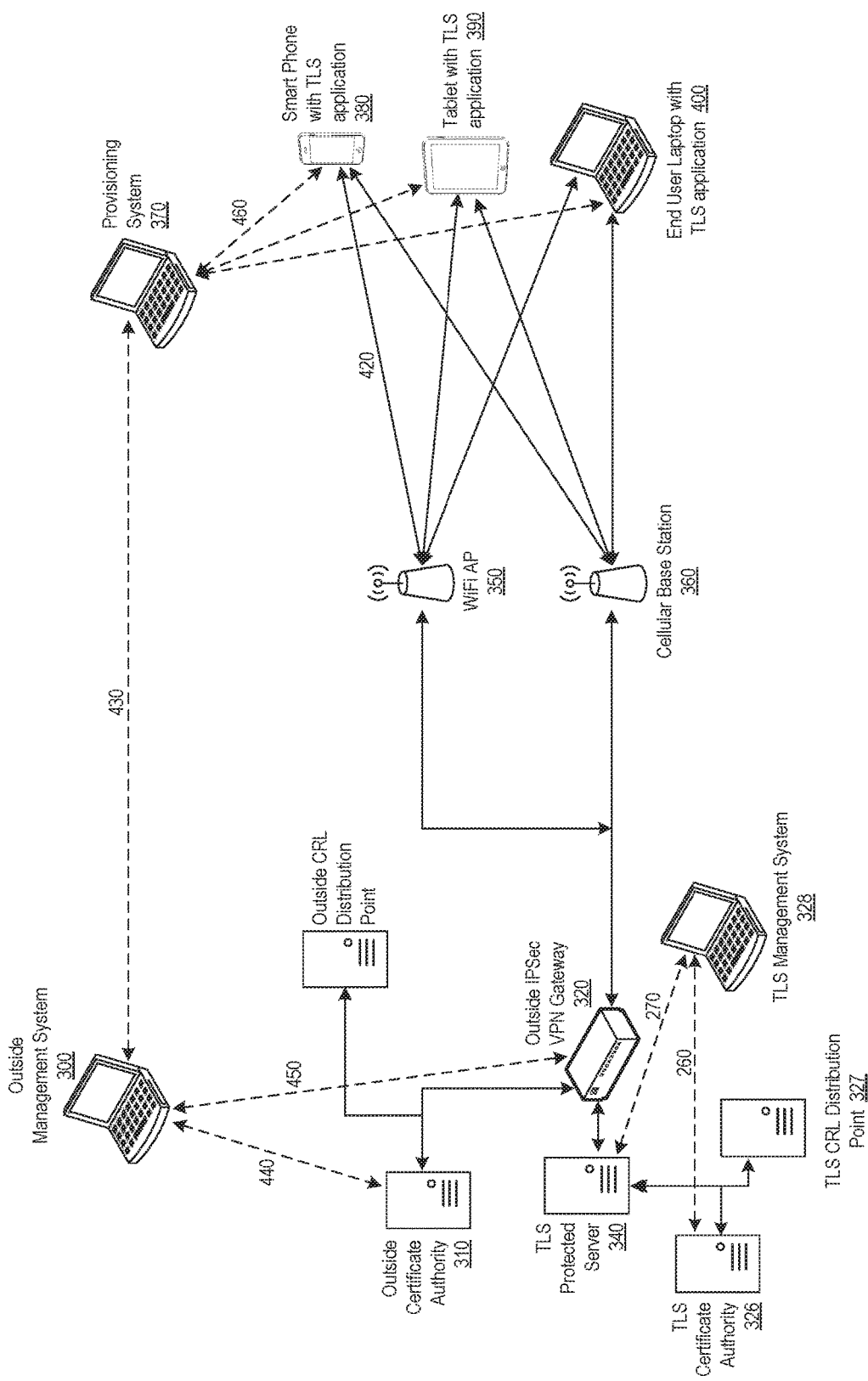
FIG. 3D illustrates a configuration that uses TLS-protected applications in place of IPsec VPN gateways, and matching TLS clients loaded on mobile EUDs. Using this method, the configuration achieves two layers of encryption.

FIG. 3D illustrates an embodiment of the system where the configuration of the system is similar to FIG. 3B, but where the inner IPsec VPN gateway is replaced by a TLS-protected server 340. In this configuration, the TLS-protected server can provide similar functionality to the TLS-protected server as described in FIG. 2A, providing a wide range of enterprise service functions protected by a second layer of TLS encryption. The EUDs 380, 390, and 400 host an outside VPN client, and client applications enabled with TLS encryption. The Management Systems 300 and 380 perform similar functions to other embodiments described herein, and may be configured in the variety of configurations illustrated throughout the descriptions.

Figure 3E:
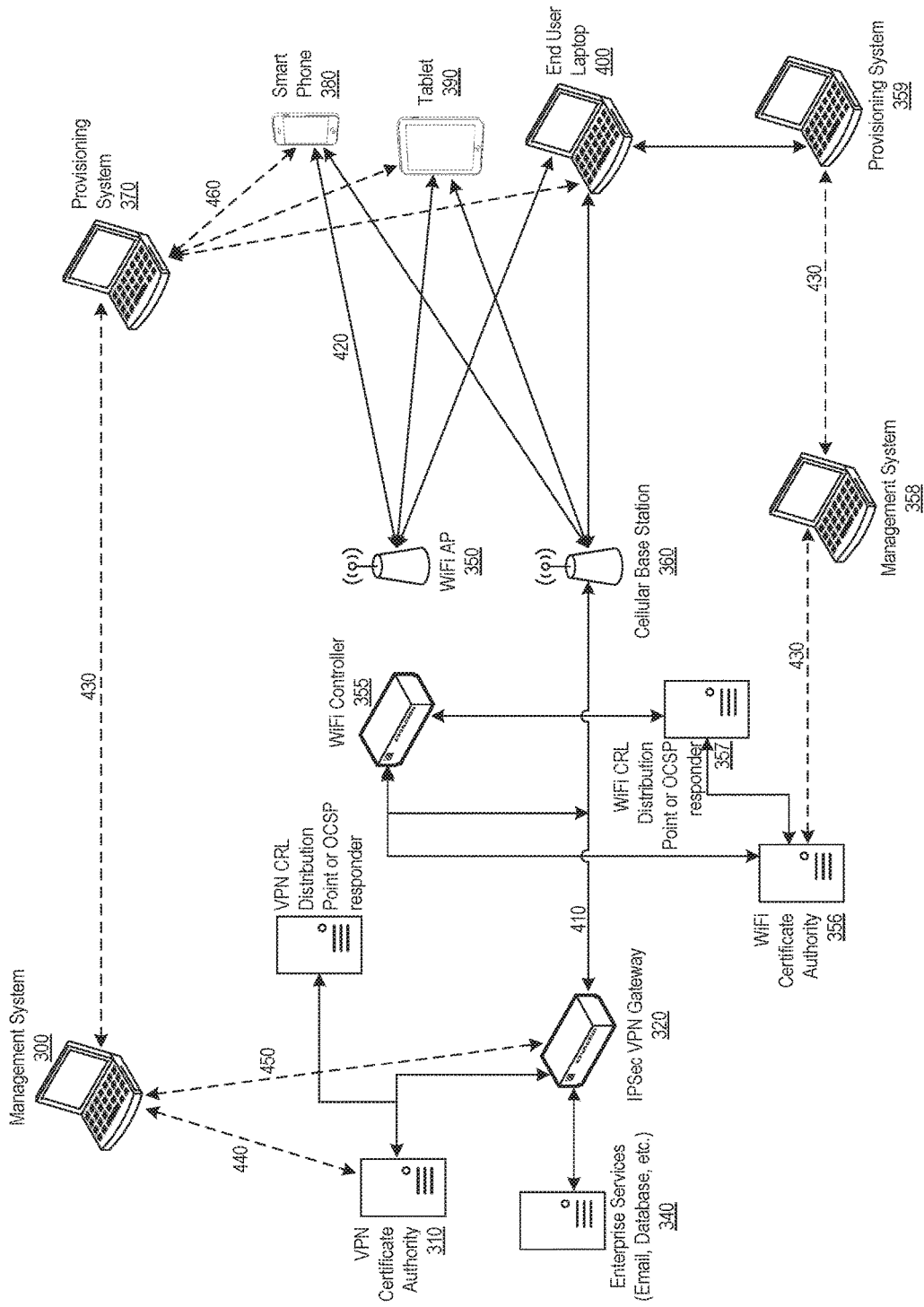
FIG. 3E illustrates a configuration similar to FIG. 3A, but with the addition of a PKI-enabled infrastructure controlling a Wi-Fi infrastructure, and using Wi-Fi encryption such as WPA2 (Wi-Fi Protected Access II). In this instance, the outside encryption tunnel is Wi-Fi, and the inside encryption tunnel is IPsec VPN.

FIG. 3E illustrates an embodiment of the system similar to FIG. 3A, but contains the addition of Wi-Fi-based encryption equipment configured to use PKI, providing an outside layer of encryption based on Wi-Fi standards such as WPA-EAP (Wi-Fi Protected Access—Extensible Authentication Protocol). In this embodiment, the addition of a Wi-Fi controller 355 (which may be a discrete device, or be integrated into the Wi-Fi Access Point (AP) 350) is serving as an encryption gateway. This configuration provides two layers of encryption (VPN and Wi-Fi). The controller utilizes a CA 356 and CDP/OCSP responder 357 for PKI services. EUDs host a Wi-Fi supplicant (client software stack) and VPN client that match the HQ/NOC/Teleport infrastructure. The Management Systems 300 and 358 perform similar functions to other embodiments described herein, and may be configured in the variety of configurations illustrated throughout the descriptions. As described previously, this configuration illustrates a second Provisioning System 359 which may be used to provision/manage the EUD's Wi-Fi configuration.

Figure 3G:
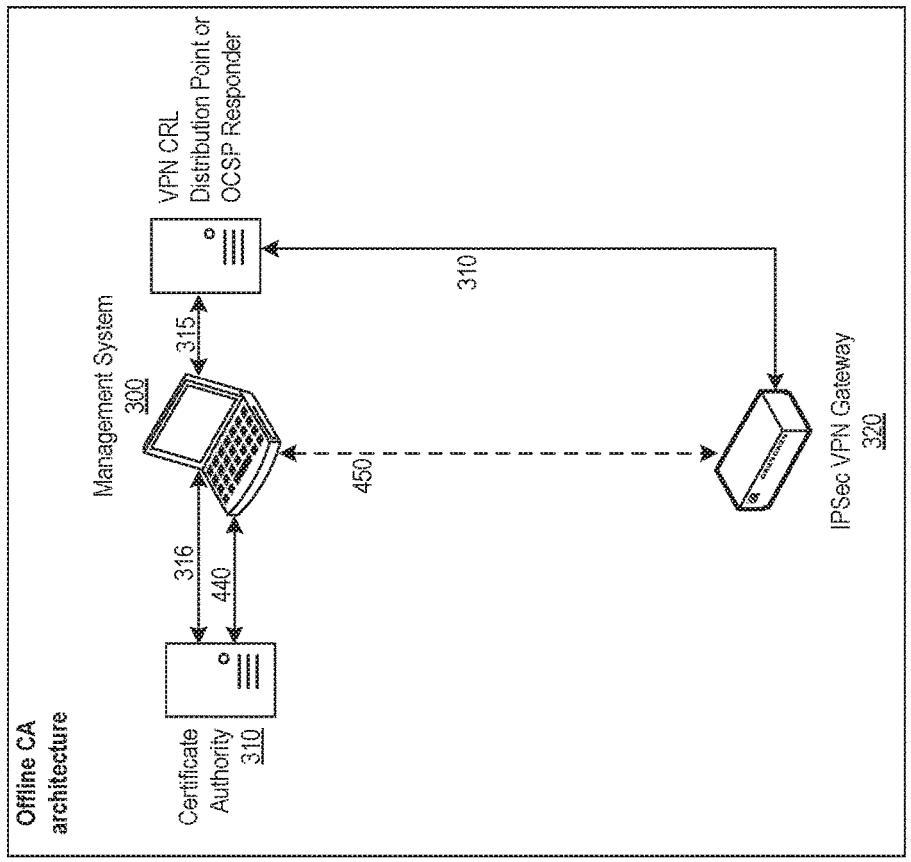
FIG. 3G illustrates an alternative embodiment of the PKI subcomponents, shown in the "Offline CA" configuration, the Management System provides the CDP or OCSP responder functions for the network, and the CA may be taken offline when not performing certificate signing tasks.
Figure 3F:
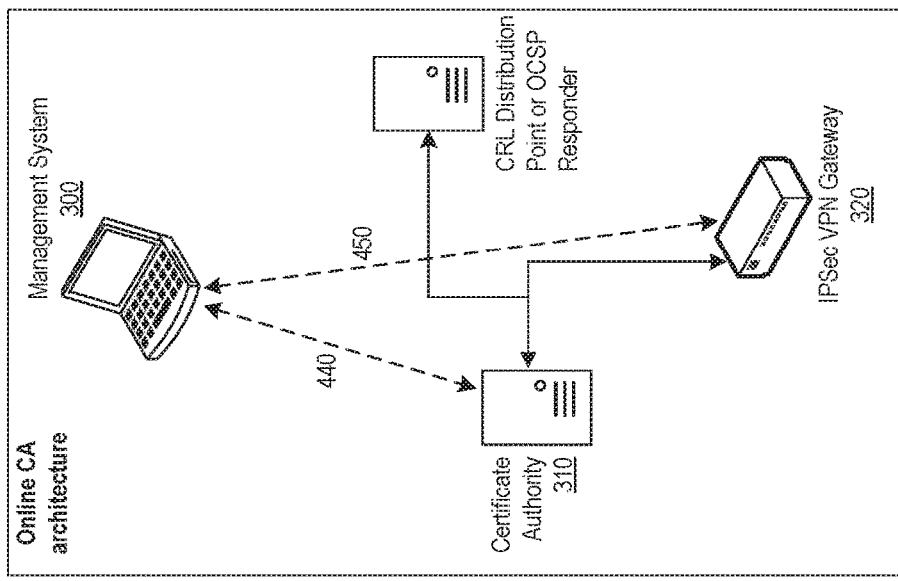
FIG. 3F illustrates an alternative embodiment of the PKI subcomponents. Shown is an "Online CA" architecture that assumes that the CA is available to the network at any time, and that it is (optionally) operatively coupled to a CDP or OCSP responder, or that those functions are integrated into the CA.

FIG. 3Fd illustrates an alternate CA configuration. The "Online CA architecture" illustrates the standard configuration shown in most of the preceding figures, and is included for reference. FIG. 3G illustrates an alternate embodiment labelled "Offline CA architecture" illustrates a configuration where the Management System 300 provides the primary communications pathway to the CA 310, so that the CA is not made directly available from other network devices. The Management System 300 provides communication to the CDP/OCSP responder, and, in another embodiment, the Management System may be combined with the CDP/OCSP responder so that the Management System itself provides those services. Online communications between encryption equipment such as IPsec VPN Gateways or TLS-protected servers (not shown) may be configured to be always online, but the CA 310 may be taken off the network and/or completely powered down as an additional security measure, when not in use.

Aspects of the system can accomplish the setup and configuration of encryption equipment using PKI using the following general process:

- After authorizing operators and populating configuration information with default values, query authorized users for input values to be used in the configuration.
- Apply configuration information to the encryption equipment.
- Instruct the encryption equipment to generate private keys and certificate signing requests (or perform that function in the software, on behalf of equipment that does not have the capability, through an agent or provisioning system).
- Transmit the CSR to the CA, (or to the Management System acting as an intermediary if the originating request comes from a Provisioning System or a remote Management System), through automated online means, or through manual means (such as with a USB device or media device like a CD-ROM).
- Cause the CA to sign the certificate and optionally supply the CA's certificate. This can be done through a CA API from a remote location, or via a portion of the system (software agent) co-resident with the CA acting as an agent.
- Transmit the signed certificate and optional CA certificate back to the encryption device, and cause the device to load the certificates for use in establishing and maintaining encrypted tunnels.

Figure 4:
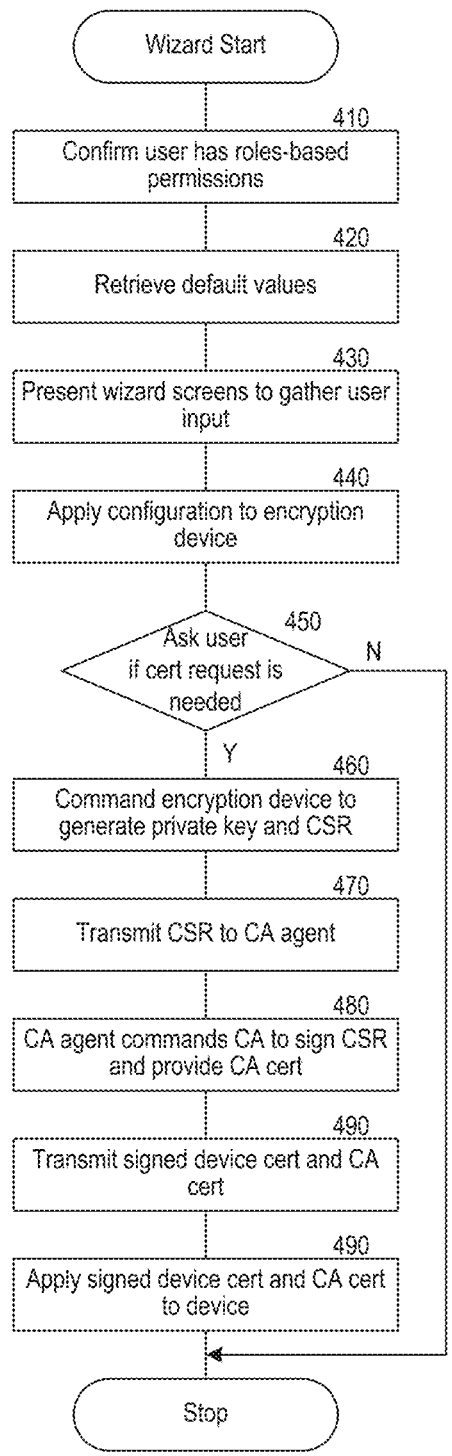
FIG. 4 illustrates the software logic flowchart implementing an embodiment of the present technology.

FIG. 4 illustrates program control flow for one embodiment of the Management System, following the general description above. Once the system confirms authorization of the operator of the Management System 410, the Management System retrieves from storage and populates in-memory configuration templates and dialog boxes with organizationally-specified defaults 420. This enables organizations to reduce reliance on manually-entered values, reducing the likelihood of typing or transcription errors. The template method enables organizations to ensure that the base configuration is compliant with organizational policy.

Wizard screens are shown to the user in sequence 430, retrieving values that cannot be specified in advance by default values. At the end of the sequence, the Management System applies the configuration information to the encryption device as needed to prepare it for final loading of digital certificates 440. The Management System may use a variety of methods to load the configuration information, including, but not limited to, the use of APIs, command line interfaces, and configuration files in any format such as XML (Extensible Markup Language), flat file, binary, etc. The Management System may use a variety of communication mediums including IP over Ethernet, or serial connections, etc. Some devices may need digital certificates loaded before configuration is applied, in which case the order of operations of this wizard may be reversed.

Once the configuration is applied, the Management System queries the operator to find out if a digital certificate is needed 450, and may prompt for specific input values. The Management System then sends commands to the device, causing it to generate a public/private key pair and a CSR 460. The Management System retrieves the CSR and transmits it to the CA or CA Agent 470. The CA Agent causes the CA to sign the CSR, and optionally provides a copy of the CA (master) certificate, which enables mutual authentication 480. The Management System transmits the signed device certificate and CA certificate 490. Lastly, the Management System (or Provisioning System) installs (or causes to be installed) the certificates onto the encryption device 500.

Figure 5A:
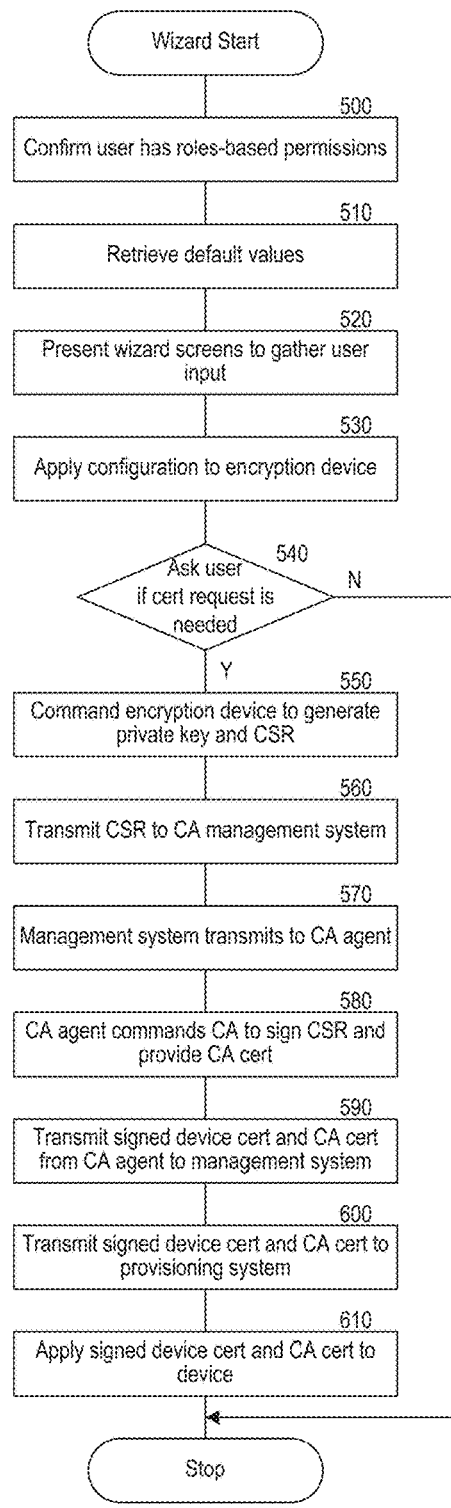
FIG. 5A illustrates the software logic flowchart implementing an embodiment of the present technology. In this embodiment, the system includes the use of a provisioning workstation that generates keys and manages provisioning for mobile devices.

FIG. 5A illustrates a process similar to that in FIG. 4, with the added steps of transmitting the CSR (over a trusted network link, in-band, out of band) from a remote site 560 to a central Management System receiving the CSR on behalf of a CA 570. In this embodiment, the central Management System in turn transmits the CSR to the CA or CA Agent 570, and the process is reversed once the CSR is signed.

Figure 5B:
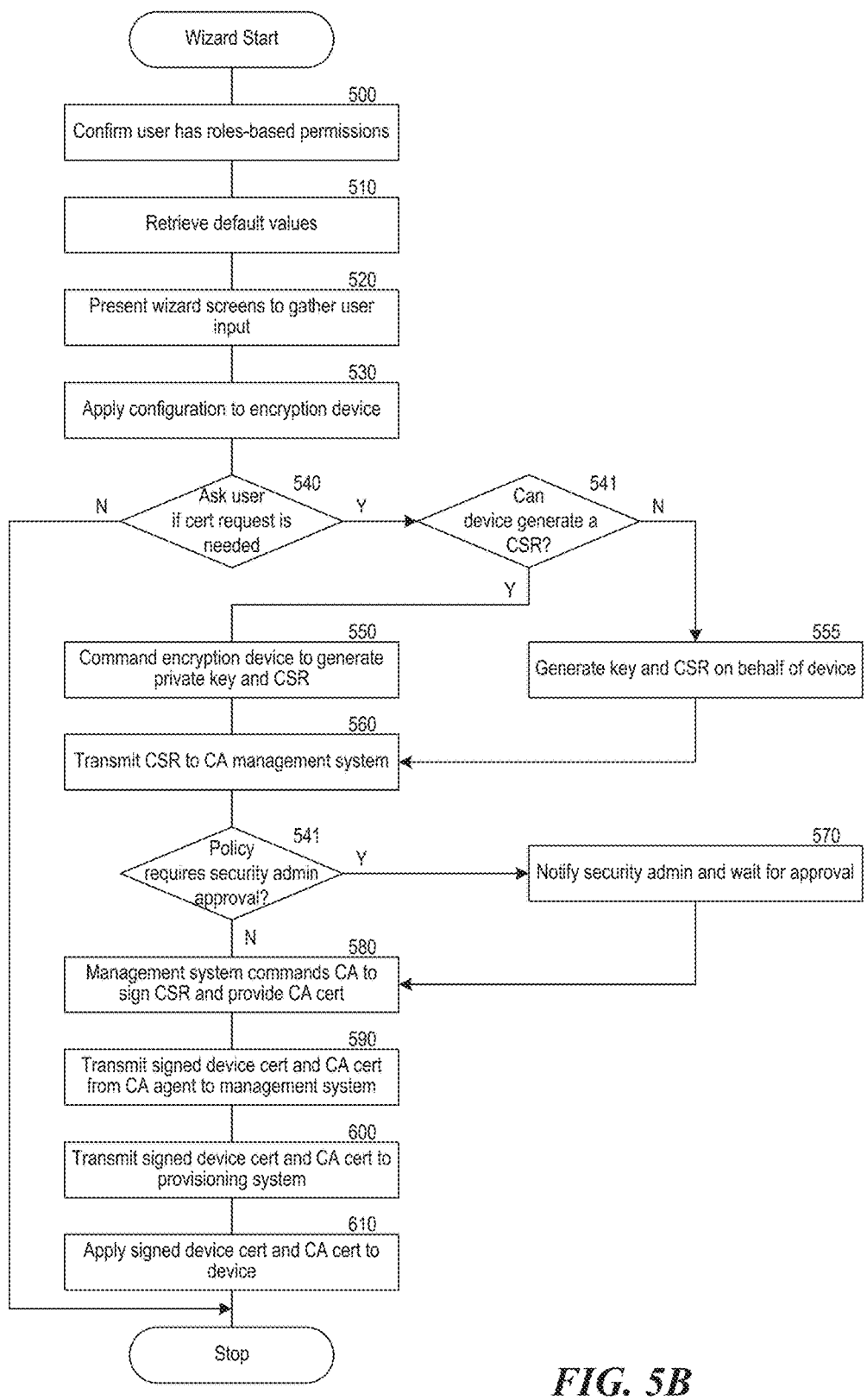
FIG. 5B illustrates the software logic in FIG. 5A, with the addition of decision points and processes whereby the Management System generates CSRs (Certificate Signing Requests) and keys on behalf of an encryption device that does not have those capabilities. It also illustrates an added decision point and process enabling security administrators to pre-approve the signing of a CSR, prior to that function being allowed.

FIG. 5B illustrates a process similar to that in FIG. 5A, but with several added steps. If the user requests a device to generate a certificate and public/private key pair, first, the device is checked to see if it has that capability 541. If it does not, a local provisioning system composed of a separate instance or subset of the Management System can either generate the key pair and certificate on behalf of the device, or it can communicate with an agent loaded on the device to perform that task 550. Additionally, FIG. 5B contains the added step 541 that checks to see if a security administrator must pre-approve the signing of the CSR. If so, the CSR is queued for approval by a security administrator (logged in and authorized to perform such functions) using the Management System 570. Once approved, the system proceeds through the rest of the process as illustrated in FIG. 5A.

Figure 5C:
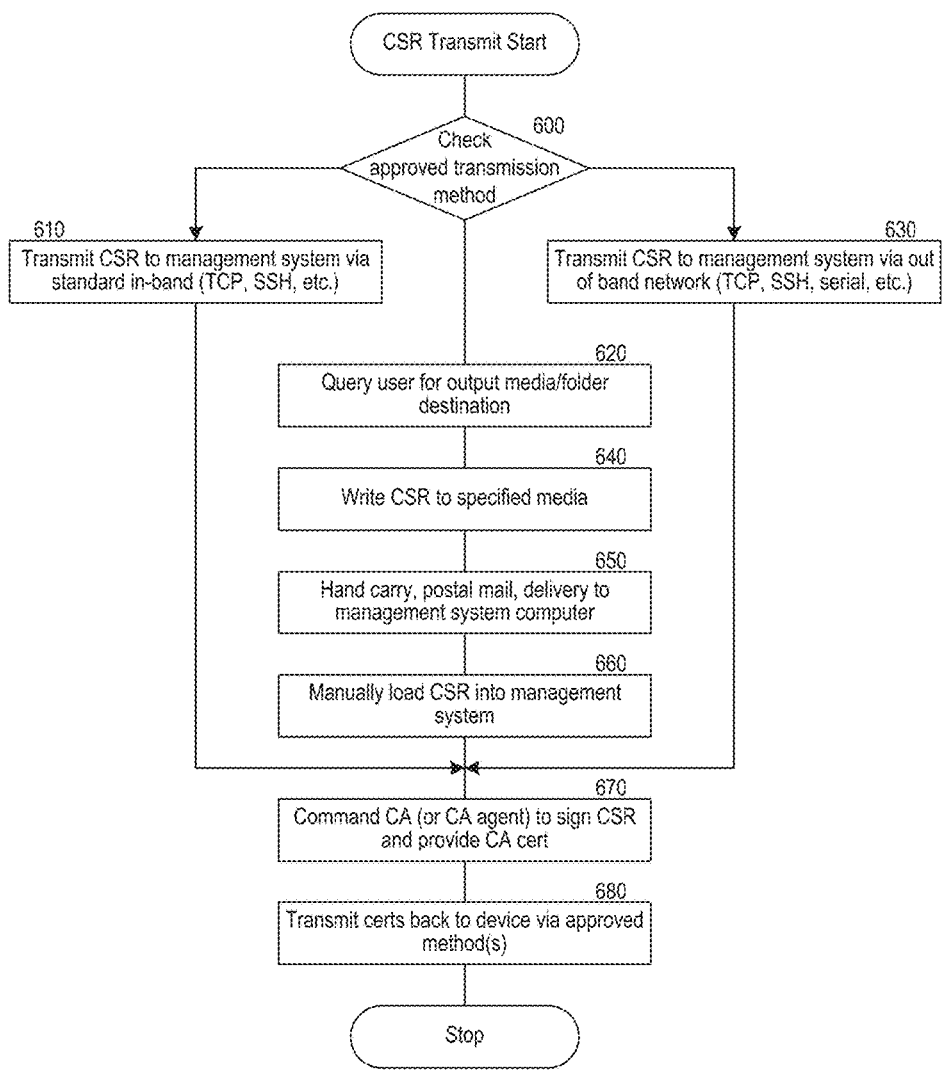
FIG. 5C illustrates a sub-process where the Management System determines allowable and available transmission means for transmitting a CSR from an encryption device to a CA. This includes the process for writing the CSR to removable media, and transferring the CSR to the CA in a manual "air-gapped" manner.

FIG. 5C illustrates processes used to transmit CSRs to CAs, and to transmit signed device certificates and CA certificates from CAs to encryption devices. As described herein, numerous methods are available for transmission, and the Management System may be configured to support one or all of them, as organizational policy allows. At the time transmission is required, the Management System checks to see which methods are configured and available 600. If the configured method is in-band 610 or out-of-band 630, the Management System uses the configured interfaces and proceeds as illustrated in previous figures. To ensure the security of this process, all link types must be trusted. In the event an "air-gapped" method is configured, the Management System queries users for the folder and media onto which the CSR/certificates will be written 620. Once the user specifies the destination, the Management System writes the information to the media 640. The media may then be hand-carried, shipped or otherwise delivered to the Management System that is coupled to the CA 650. The media is inserted into the host operating the Management System, and the media is read and the CSR is loaded 660. The process then proceeds as illustrated in FIG. 5A.

FIG. 6 illustrates an exemplar wizard screen querying an operator of the Management System for input values used to configure an IPsec VPN gateway. The default values may be pre-set by organizational policies, ensuring operators do not choose incorrect values. Options may be removed from wizard screens when fixed configuration values are known, and organizations opt to disallow operators from changing values.

FIG. 7 illustrates an exemplar wizard screen showing the set of configuration parameters to apply to an IPsec VPN gateway, prior to the commit of the settings. This screen asks operators to confirm the settings, and also displays a checkbox that, when clicked, causes the Wizard to continue past the commit of these settings, and enter into the key generation and CSR generation phase.

FIG. 8 illustrates an exemplar wizard screen querying an operator of the Management System for input values used to create the CSR. In this embodiment, once the operator clicks "Next", the Management System proceeds through the end-to-end process of creating the public/private key pair, transmitting the CSR to the CA, causing the CA to sign the certificate and transmit it (along with the CA certificate) back to the Management System, which in turn loads the certificate on the IPsec VPN gateway.

Figure 9:
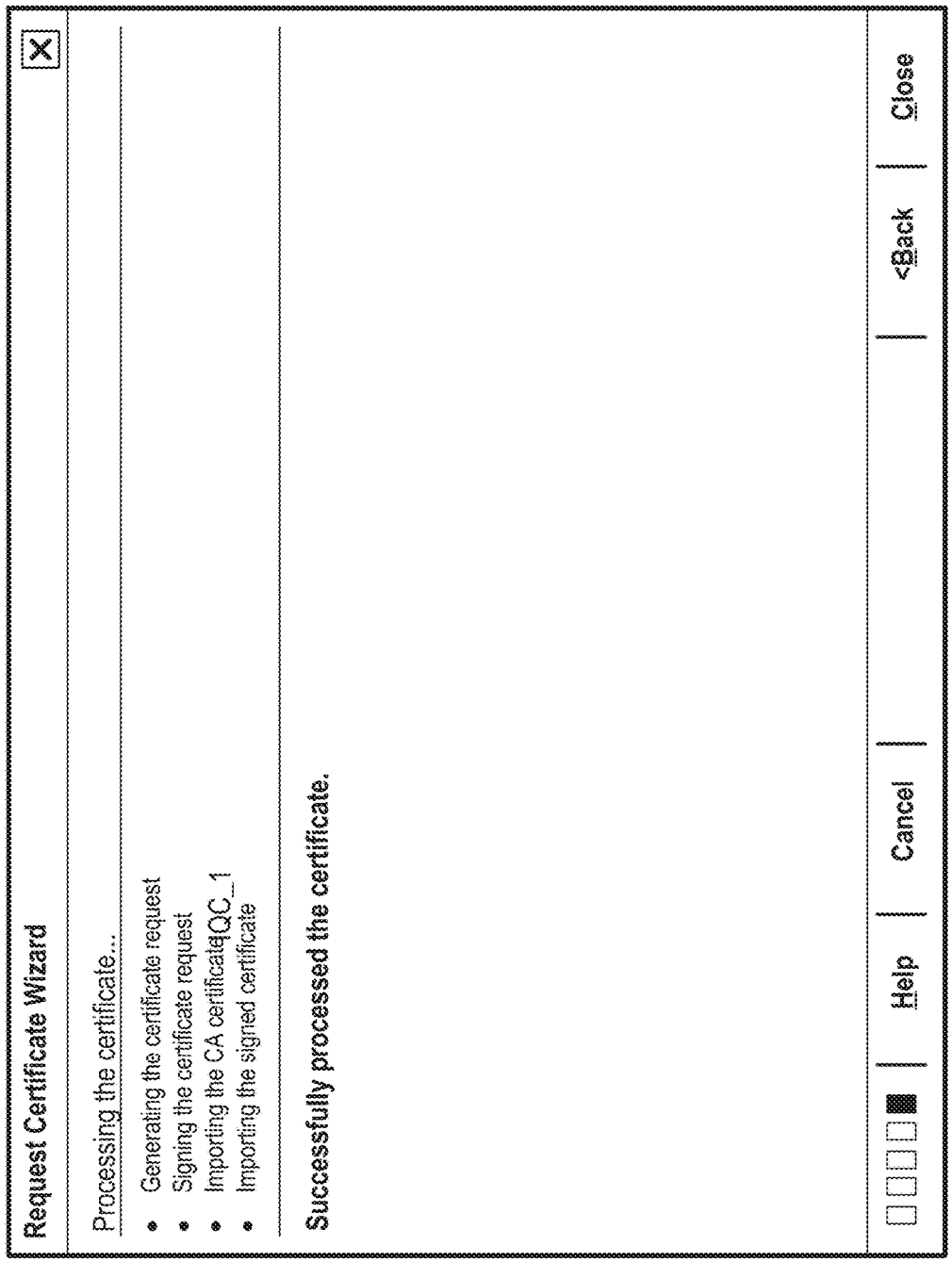
FIG. 9 illustrates an exemplary setup/configuration Wizard screen displaying the status of the digital certificate generation, transmission, signing, and loading process.

FIG. 9 illustrates an exemplar wizard screen displaying the process outlined in FIG. 6, step by step, while it is underway. Finally, the operator may click the "Close" button when the process completes. In a typical embodiment, once this process is complete, the VPN tunnels "go live" automatically.

Figure 10:
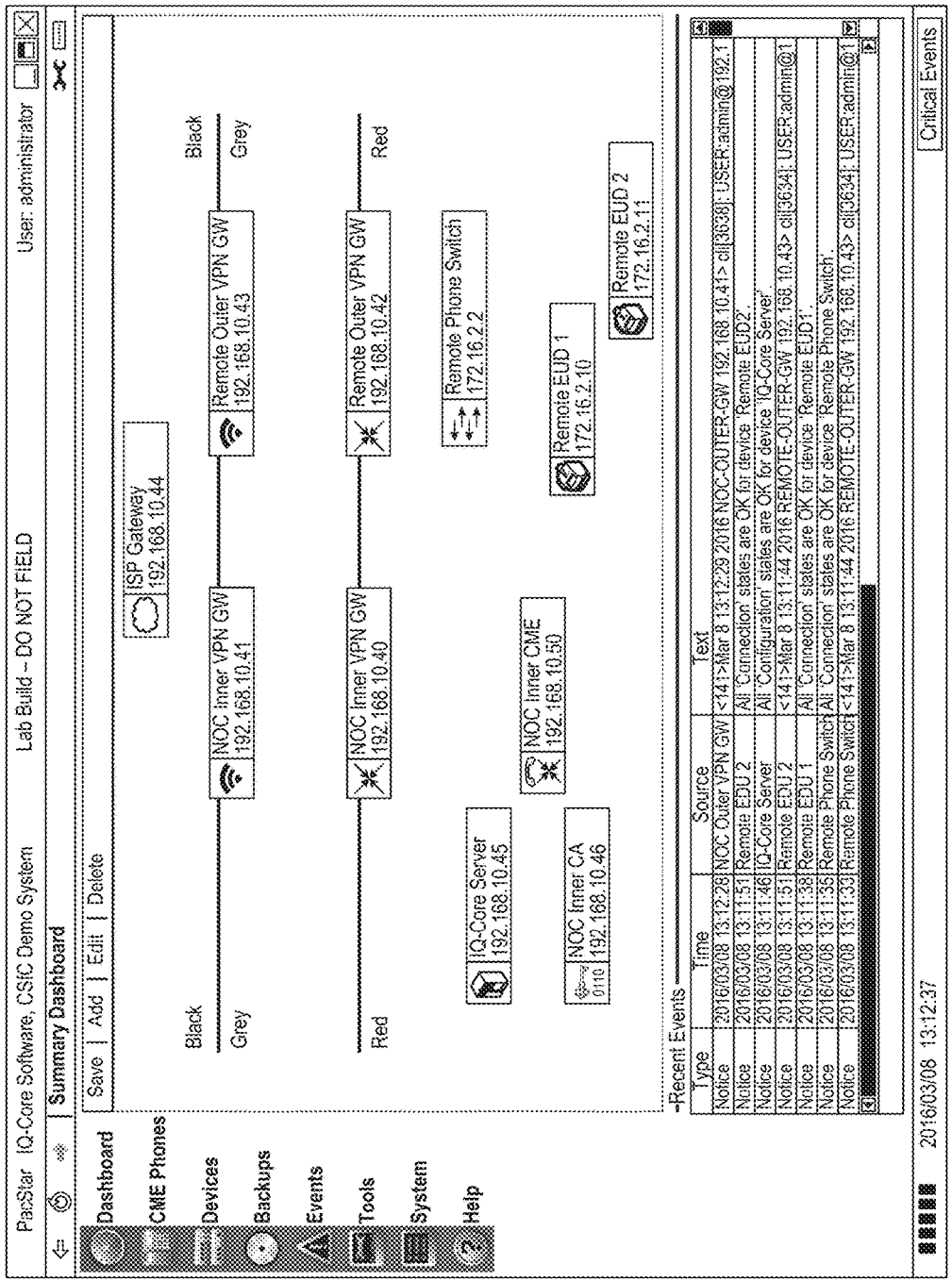
FIG. 10 illustrates an exemplary status screen showing connectivity and status between multiple (tunneled) encryption devices over a WAN link, with additional status information of enterprise services and EUDs.

FIG. 10 illustrates an exemplar Management System dashboard screen showing the link status of a complete, dual, VPN-encrypted, network system, similar to the configuration illustrated in FIG. 2A. On the left side of the center line is the HQ/NOC/Teleport equipment, with the Management System (10-Core Software), and an enterprise service (NOC Inner CME: a voice/video PBX, operating on unencrypted data). Also on the left side is shown the Inner (Inside) VPN Gateway (GW) and Outer (Outside) VPN GW. The untrusted network is a WAN provided by a commercial ISP, shown at the top of the dashboard screen. On the right side of the center line are two "remote" IPsec VPN Gateways, and finally a switch for phones conducting VoIP voice calls.

Figure 11:
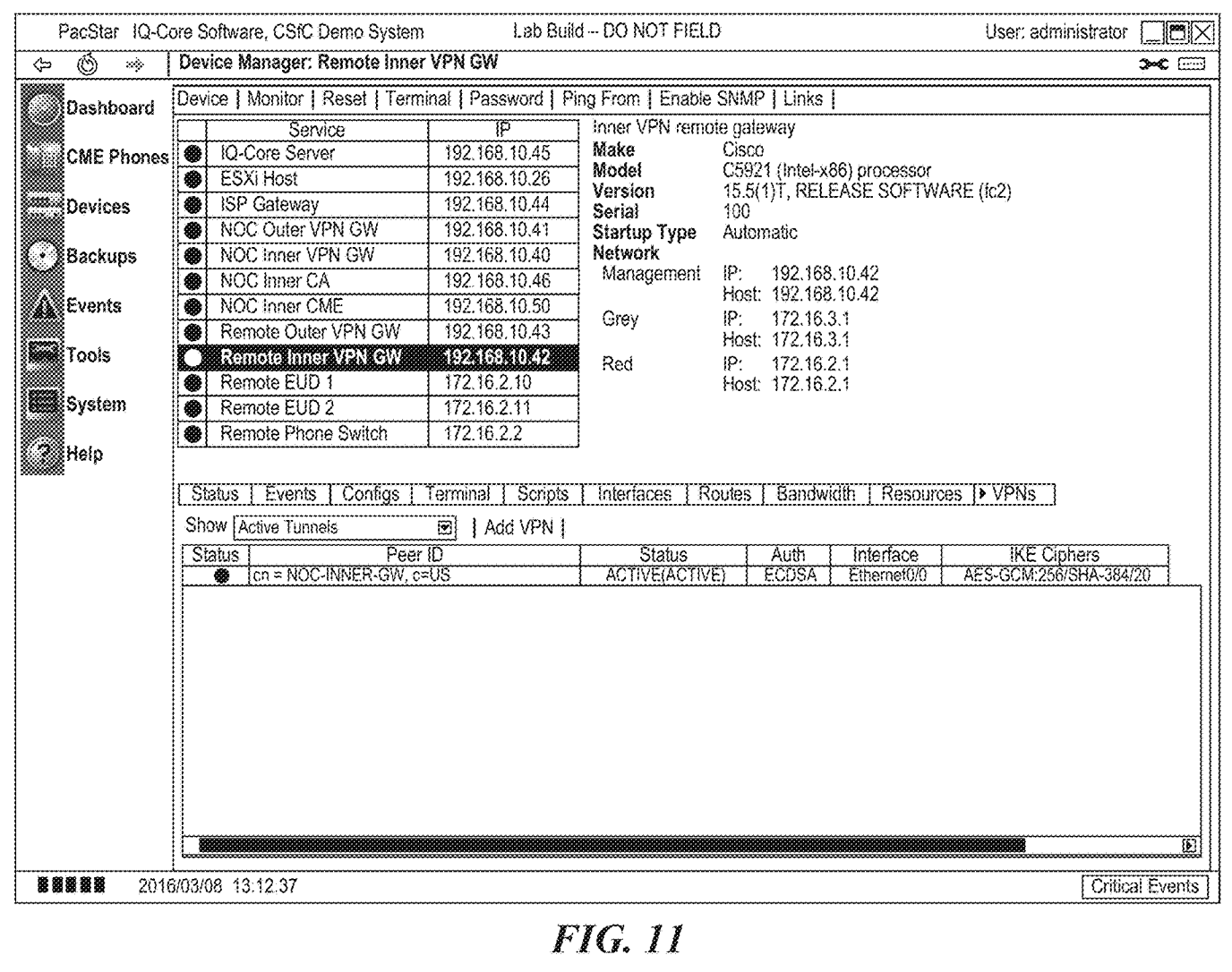

FIG. 11 illustrates a Management System device status screen, with overall status of devices shown with Red/Green indicator lights (in this case, all green). The Remote Inner (Inside) gateway is highlighted, and its summary status is shown on the right. In this illustration the gateway happens to be a Cisco model 5921 IPsec Gateway running inside a virtual machine managed by VMware ESXi. The panels below show a series of tabs enabling a variety of management functionalities. The selected tab in this illustration is the "VPN" tab, and it shows the status of the active VPN tunnel, which was created by an operator using the wizard screens in FIG. 6 though FIG. 9.

Figure 12:
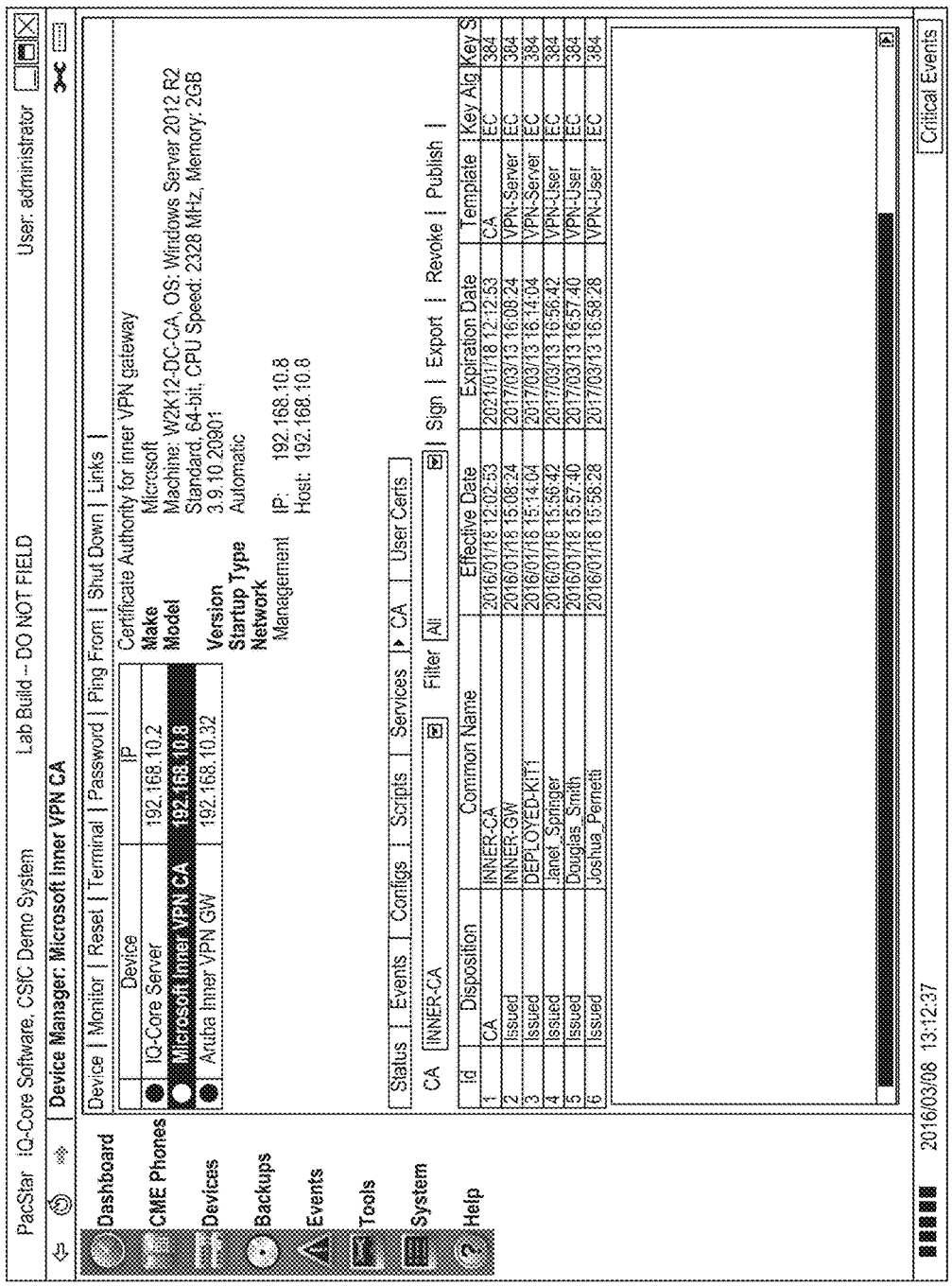
FIG. 12 illustrates an exemplary status screen showing status issued (signed) digital certificates to be used as device and user certificates, as reported by a CA.

FIG. 12 shows a sample Management System screen managing a CA, in this case, the Microsoft Windows CA running on Windows Server 2012 R2. The panels below show a variety of management functions, including tabs for managing certificates. In this illustration, the CA tab is selected, and shows the issued and active certificates that have been signed by the CA. Buttons in this panel launch wizards to sign CSRs, export certificates to removable media, revoke certificates, and publish CRLs to CDP/OCSP responders.

Figure 13A:
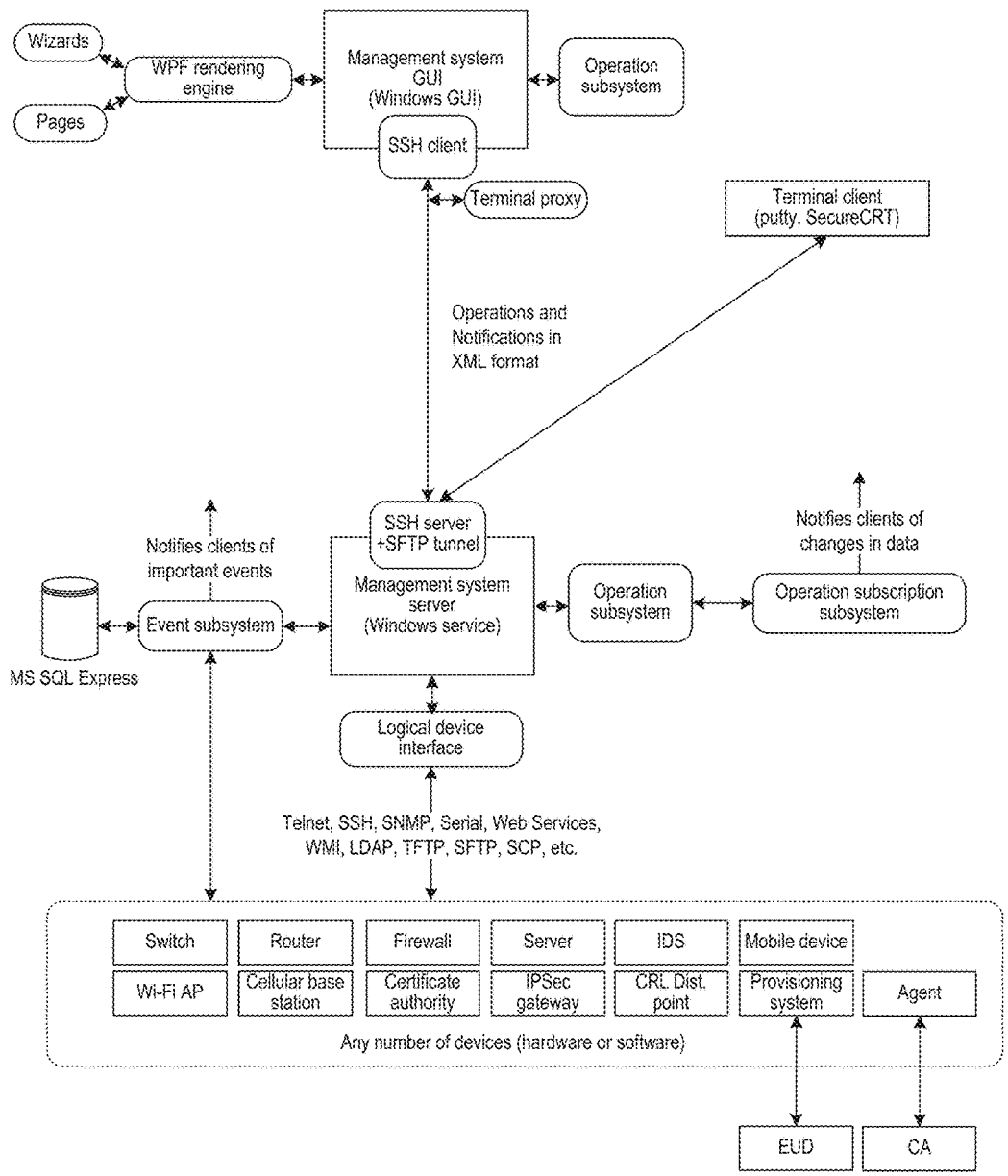
FIG. 13A illustrates a software module architecture in accordance with an embodiment of the present disclosure, showing a Graphical User Interface (GUI), monitoring components, wizard module, and device interfaces, where the GUI is operatively coupled to any number of network devices, including encryption devices and PKI infrastructure.

FIG. 13A illustrates a software module and subsystem communications architecture implementing the Management System. The software architecture consists of a GUI system with user interface rendering subsystem, the WPF Rendering Engine, and a subsystem responsible for sending execution commands to the Management System server component. The client/server architecture enables multiple clients to simultaneously communicate with the server, providing access to the Management System for multiple and even remote operators. The server component typically (though not always) resides near the equipment under management, and communicates and manages the equipment using any variety of available interfaces.

The Management System may also communicate with other instances or subsets of this software, where those instances act as Provisioning Systems and Agents providing capabilities integrated with or on behalf of EUDs, CAs, and other encryption equipment, where those devices require supplementation to function in the overall architecture. The communications links between the Provisioning Systems, Agents and Management System server can be secured using a variety of methods, providing a secure channel between them, which also may not be available without the deployment of the Agents or Provisioning Systems.

Figure 13B:
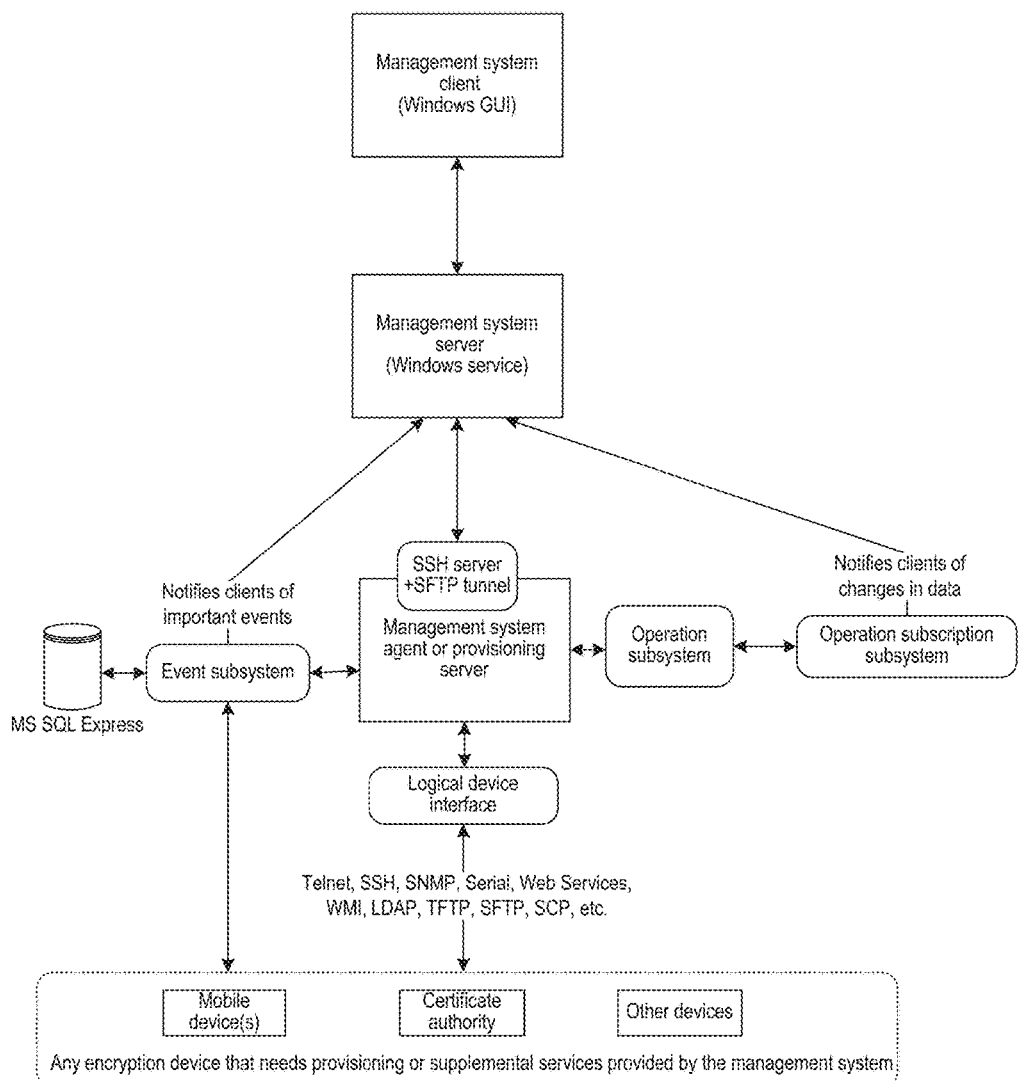
FIG. 13B illustrates a software module architecture in accordance with an embodiment of the present disclosure, showing a separate (reduced functionality) instance of the Management System functioning as an Agent or a Provisioning System.

FIG. 13B illustrates details of the Agents or Provisioning Systems. These systems may use the same internal architecture as the Management System, but provide interfaces to only the device or device(s) under management, with reduced functionality. In FIG. 13B, the Management System boxes are simplified for illustration purposes, and the Agent/Provisioning Server is shown as using the identical architecture to the Management System Server in FIG. 13A, with the exception that only Mobile Device(s) and CAs are supported as example devices under management. In typical embodiments, the Mobile Devices and CAs will be managed by separate instances of the Agent/Provisioning Server code. Additionally, while the Agent instance of this software is designed to be "headless" in that it has no GUI, the Provisioning System may support GUI access in a manner and design similar to the GUI in FIG. 13A.

Remarks

The above description and drawings are illustrative, and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

We claim:

1. A method performed by a management system to establish encrypted communications, the method comprising:

maintaining a dataset of default encryption values for implementing a selected one of a plurality of encryption policies associated with one or more organizations;

querying, via a graphical user interface (GUI) of the management system, a user to input values for configuring an encryption device;

sending, via in-band or out-of-band communications methods, the input values, and at least a portion of the default encryption values to the encryption device, for configuring the encryption device based on the selected one of the plurality of encryption policies;

based on the input values and the at least a portion of the default encryption values, sending, via the management system, first instructions to the encryption device to generate a private key and a certificate signing request or performing the generation of the private key and the certificate signing request on behalf of the encryption device;

transmitting the certificate signing request to a certificate authority for signature;

sending, via the management system, second instructions to the certificate authority to sign the certificate signing request;

transmitting the signed certificate to the encryption device, wherein the transmitting the signed certificate to the encryption device causes the encryption device to load the signed certificate for use in establishing and maintaining encrypted communication in accordance with the selected one of the plurality of encryption policies; and in response to receiving a selection of a revoke option via the GUI of the management system to revoke the signed certificate, immediately sending, via the management system, both revocation instructions to the certificate authority and termination instructions to the encryption device to provide an integrated process of revocation and termination, wherein upon receiving the termination instructions, the encryption device immediately terminates all active encryption sessions associated with the signed certificate without manual intervention.

2. The method of claim 1, wherein the encryption device is a first encryption device, wherein the input values are first input values, wherein the private key is a first private key, wherein the certificate signing request is a first certificate signing request, wherein the certificate authority is a first certificate authority, and wherein the method further comprises:

querying, via the GUI, the user to input second input values for configuring a second encryption device;

sending the second input values and a second portion of the default encryption values settings to the second encryption device for configuring the second encryption device based on a selected second one of the plurality of encryption policies;

sending third instructions to the second encryption device to generate a second private key and a second certificate signing request or performing the generation of the second private key and the second certificate signing request on behalf of the second encryption device;

transmitting the second certificate signing request to the first certificate authority or second certificate authority for signature;

sending fourth instructions to the first or second certificate authority to sign the second certificate signing request; and transmitting the second signed certificate to the second encryption device, wherein the transmitting of the second signed certificate to the second encryption device causes the second encryption device to load the second signed certificate for use in establishing and maintaining encrypted tunnels for communication,
wherein the encrypted tunnels are partially based on the first encryption device implementing encryption at a first layer of a communication stack and the second encryption device implementing encryption on a second layer of the communication stack.

3. The method of claim 2, wherein the certificate authority is a first certificate authority, and wherein the first and second encryption devices, the first certificate authority, and a second certificate authority are located in the same location and commutatively coupled to the management system.

4. The method of claim 1, wherein the encryption device is in a remote location relative to the certificate authority, and the management system communicates indirectly to the certificate authority or indirectly to the encryption device.

5. The method of claim 1, wherein an intermediary system is configured to facilitate the signing of the certificate signing request on behalf of the encryption device by implementing an application program interface (API).

6. The method of claim 1, wherein the querying the user for input values further comprising:
receiving, via the GUI, a request from the user that causes the management system to perform the transmitting of the certificate signing request to the certificate authority and to perform the transmitting of the signed certificate to the encryption device.

7. The method of claim 1, wherein the user is a first user, further comprising:
implementing a separation of duties method,
wherein the separation of duties method includes:
causing the management system, in response to the first user, to cause the certificate signing request to be generated on the encryption device, and wherein the management system queues the certificate signing request for a second user for approval;
sending, via the management system, the certification signing request to the certificate authority to causes the certificate signing request to be signed; and
retrieving, via the management system, the signed certificate and loading it on the encryption device, or queuing it for the first user, wherein the first user causes the management system to load the signed certificate onto the encryption device.

8. The method of claim 1, further comprising:
performing the generation of the private key and the certificate signing request on behalf of the encryption device if the encryption device cannot autonomously generate the private key and the certificate signing request.

9. A non-transitory computer-readable medium encoded with instructions that, when executed by a processor of a management system, perform a method for securing communications for a device, the method comprising:
maintaining a dataset of default encryption values for implementing a selected one of a plurality of encryption policies associated with one or more organizations;
querying, via a graphical user interface (GUI) of the management system, a user to input values for configuring an encryption device;
sending, via in-band or out-of-band communications methods, the input values, and at least a portion of the default encryption values to the encryption device, for configuring the encryption device based on the selected one of the plurality of encryption policies;
based on the input values and the at least a portion of the default encryption values, sending, via the management system, first instructions to the encryption device to generate a private key and a certificate signing request or performing the generation of the private key and the certificate signing request on behalf of the encryption device;
transmitting the certificate signing request to a certificate authority for signature;
sending, via the management system, second instructions to the certificate authority to sign the certificate signing request;
transmitting the signed certificate to the encryption device, wherein the transmitting of the signed certificate to the encryption device causes the encryption device to load the signed certificate for use in establishing and maintaining encrypted communication in accordance with the selected one of the plurality of encryption policies; and
in response to receiving a selection of a revoke option via the GUI of the management system to revoke the signed certificate, immediately sending, via the management system, both revocation instructions to the certificate authority and termination instructions to the encryption device to provide an integrated process of revocation and termination, wherein upon receiving the termination instructions, the encryption device immediately terminates all active encryption sessions associated with the signed certificate without manual intervention.

10. The non-transitory computer-readable medium of claim 9, wherein the encryption device is a first encryption device, wherein the input values are first input values, wherein the private key is a first private key, wherein the certificate signing request is a first certificate signing request, wherein the certificate authority is a first certificate authority, and wherein the method further comprises:
querying, via the GUI, the user to input second input values for configuring a second encryption device;
sending the second input values and a second portion of the default encryption values to the second encryption device for configuring the second encryption device;
sending third instructions to the second encryption device to generate a second private key and a second certificate signing request or performing the generation of the second private key and the second certificate signing request on behalf of the second encryption device;
transmitting the second certificate signing request to the first certificate authority or a second certificate authority for signature;
sending fourth instructions to the first or second certificate authority to sign the second certificate signing request; and
transmitting the second signed certificate to the second encryption device, wherein the transmitting of the second signed certificate to the second encryption device causes the second encryption device to load the second signed certificate for use in establishing and maintaining encrypted tunnels for communication,
wherein the encrypted tunnels are partially based on the first encryption device implementing encryption at a first layer of a communication stack and the second encryption device implementing encryption on a second layer of the communication stack.

11. The non-transitory computer-readable medium of claim 10, the certificate authority is a first certificate authority, and wherein the first and second encryption devices, the first certificate authority, and the second certificate authority are located in the same location and commutatively coupled to the management system.

12. The non-transitory computer-readable medium of claim 9, wherein the encryption device is in a remote location relative to the certificate authority, and the management system communicates indirectly to the certificate authority or indirectly to the encryption device.

13. The non-transitory computer-readable medium of claim 9, wherein the intermediary system is configured to sign the first and second certificate signing request on behalf of the first and second encryption devices by implementing an application program interface (API).

14. The non-transitory computer-readable medium of claim 9, wherein querying the user for input values further comprising:
   receiving, via the GUI, a request from the user that causes the management system to perform the transmitting of the certificate signing request to the certificate authority and to perform the transmitting of the signed certificate to the encryption device.

15. The non-transitory computer-readable medium of claim 9, wherein the user is a first user, further comprising:
   implementing a separation of duties method,
   wherein the separation of duties method includes:
   the first user causing the management system, in response to the first user, to cause the certificate signing request to be generated on the encryption device, and wherein the management system queues the certificate signing request for a second user for approval;
   sending, via the management system, the certification signing request to the certificate authority to causes the certificate signing request to be signed; and
   retrieving, via the management system, the signed certificate and loading it on the encryption device, or queuing it for the first user, wherein the first user causes the management system to load the signed certificate onto the encryption device.

16. The non-transitory computer-readable medium of claim 9, wherein the method further comprises:
   performing the generation of the private key and the certificate signing request on behalf of the encryption device if the encryption device cannot autonomously generate the private key and the certificate signing request.

* * * * *